United States Patent
Ebrahimi Afrouzi

(10) Patent No.: US 10,579,066 B1
(45) Date of Patent: Mar. 3, 2020

(54) SYSTEM AND METHOD FOR ESTABLISHING VIRTUAL BOUNDARIES FOR ROBOTIC DEVICES

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 290 days.

(21) Appl. No.: 15/177,259

(22) Filed: Jun. 8, 2016

Related U.S. Application Data

(63) Continuation-in-part of application No. 14/673,656, filed on Mar. 30, 2015, now Pat. No. 9,764,473.

(51) Int. Cl.
| | | |
|---|---|---|
| *G05D 1/00* | (2006.01) | |
| *B25J 9/16* | (2006.01) | |
| *G05D 1/02* | (2020.01) | |
| *A01D 34/00* | (2006.01) | |

(52) U.S. Cl.
CPC ......... *G05D 1/0276* (2013.01); *A01D 34/008* (2013.01); *B25J 9/1664* (2013.01); *B25J 9/1694* (2013.01); *G05D 1/0238* (2013.01); *G05D 1/0242* (2013.01); *A47L 2201/04* (2013.01); *G05D 2201/0203* (2013.01); *G05D 2201/0208* (2013.01); *G05D 2201/0215* (2013.01)

(58) Field of Classification Search
CPC ... G05D 2201/0203; G05D 2201/0215; G05D 1/0251; G05D 1/0238; G05D 1/0242; G05D 2201/0207; G05D 1/0276; G05D 2201/0208; Y10S 901/01; Y10S 901/46; B25J 9/0003; B25J 9/1664; B25J 9/1666; B25J 9/1694; B25J 9/1605; G06T 7/0044; A01D 34/008; A47L 2201/04
See application file for complete search history.

(56) References Cited

U.S. PATENT DOCUMENTS

| | | | |
|---|---|---|---|
| 5,353,224 A | 10/1994 | Lee et al. | |
| 5,537,017 A | 7/1996 | Feiten et al. | |
| 5,548,511 A | 8/1996 | Bancroft | |
| 5,634,237 A | 6/1997 | Paranjpe | |
| 6,389,329 B1 | 5/2002 | Colens | |
| 8,428,776 B2 | 4/2013 | Letsky | |
| 8,659,256 B2 | 2/2014 | Jones et al. | |
| 2008/0276408 A1* | 11/2008 | Gilbert, Jr. ............. | A47L 11/34 15/320 |
| 2009/0043440 A1* | 2/2009 | Matsukawa .......... | G05D 1/0214 701/25 |
| 2014/0005873 A1* | 1/2014 | Chen .................... | G05D 1/0263 701/23 |

(Continued)

*Primary Examiner* — Jason Holloway

(57) ABSTRACT

Methods for utilizing virtual boundaries with robotic devices are presented including: positioning a boundary component having a receiver pair to receive a first robotic device signal substantially simultaneously by each receiver of the receiver pair from a robotic device only when the robotic device is positioned along a virtual boundary; operating the robotic device to move automatically within an area co-located with the virtual boundary; transmitting the first robotic device signal by the robotic device; and receiving the first robotic device signal by the receiver pair thereby indicating that the robotic device is positioned along the virtual boundary.

19 Claims, 19 Drawing Sheets

(56) References Cited

U.S. PATENT DOCUMENTS

| | | | | |
|---|---|---|---|---|
| 2014/0102061 A1* | 4/2014 | Sandin | ............... | G05D 1/0255 56/10.2 A |
| 2014/0102062 A1* | 4/2014 | Sandin | ............... | G05D 1/0255 56/10.2 A |
| 2015/0006015 A1* | 1/2015 | Sandin | ............... | G05D 1/0255 701/23 |
| 2016/0100522 A1* | 4/2016 | Yamauchi | ............ | G05D 1/0236 701/25 |
| 2016/0297072 A1* | 10/2016 | Williams | ............ | G05D 1/0274 |
| 2017/0150676 A1* | 6/2017 | Yamauchi | ............ | G05D 1/0236 |
| 2018/0059681 A1* | 3/2018 | Kuhara | ............... | A47L 9/2852 |

* cited by examiner

SYSTEM AND METHOD FOR ESTABLISHING VIRTUAL BOUNDARIES FOR ROBOTIC DEVICES

This application is a Continuation in Part of Ser. No. 14/673,656 filed Mar. 30, 2015 by the present inventor.

FIELD OF THE INVENTION

This disclosure relates to robotic systems generally, and more particularly to providing virtual boundaries for limiting surface coverage by robotic devices. This invention relates to confining the surface movement to defined areas of mobile robotic devices.

BACKGROUND OF THE DISCLOSURE

Robotic devices may operate within a confined portion of a physical area or workspace. Mobile robots may perform routine tasks, such as vacuuming, sweeping, mopping, cutting grass, etc., without moving into certain areas specified by the user. However, on occasion, a vacuuming robot operating within a first area may be permitted to travel into a second area prior to satisfactory completion of, for example, a vacuuming task within the first area. In other instances, the vacuuming robot may collide with and, potentially, damage a fragile or unstable object that is not detected by sensors accessed by the vacuuming robot. In other instances, a user may simply prefer that a vacuuming robot remain outside of an area, for example, if the area is currently in use. Thus, it may be useful to confine a robotic device so as to operate within certain areas and to prevent unwanted transition between areas.

One approach toward confining robotic device may be to utilize physical barriers that block the robotic device from entering, or becoming proximate with, one or more objects and/or areas of operation. However, this solution is neither efficient nor practical since substantial extra equipment (e.g., barriers and/or other objects) may encumber routine movement through the area of operation by the robotic device. Further, such an approach may involve an undesirable degree of human intervention, which may decrease a level of autonomy of the system as a whole.

Various systems have been proposed to confine and control robotic devices within subsections of workspaces. It can be advantageous to confine a robotic vacuum, for example, in a portion of a workspace so that it can adequately clean that space before moving on to another area. As such, systems and methods for establishing virtual boundaries for robotic devices are provided herein.

The following is a tabulation of some prior art that presently appears relevant:

| U.S. patent Documents | | | |
|---|---|---|---|
| U.S. Pat. No. | Kind Code | Issue Date | Patentee |
| 8,428,776 | B2 | 2013 Apr. 23 | RoboLabs Inc |
| 8,659,256 | B2 | 2014 Feb. 25 | iRobot Corp |
| 5,353,224 | A | 1994 Oct. 4 | Goldstar Co., Ltd., A Corp. of Korea, Goldstar Co Ltd |
| 5,537,017 | A | 1996 Jul. 16 | Siemens AG |
| 5,548,511 | A | 1996 Aug. 20 | NIL-FISK ADVANCE A.S., Axxon Robotics LLC, Nilfisk-Advance Inc |
| 5,634,237 | A | 1997 Jun. 3 | Paranjpe; Ajit P. |
| 6,389,329 | B1 | 2002 May 15 | Andre Colens |

SUMMARY

A virtual boundary device having one or more pairs of signal receivers may be placed at a desired location to establish a virtual boundary. Anytime a first receiver from the pair of receivers of the virtual boundary device receives a signal from a corresponding robotic device, which is programmed to emit wireless signals, the virtual boundary device emits a first signal which is received by the corresponding robotic device. Anytime a second receiver of the pair of receivers of the virtual boundary device receives a signal from the corresponding robotic device, which is programmed to emit wireless signals, the virtual boundary device emits a second signal which is received by the corresponding robotic device. Upon receiving the first signal and the second signal from the virtual boundary device, substantially simultaneously, the robotic device may be programmed to activate movement patterns to turn away from or otherwise not cross a virtual boundary created by methods disclosed herein. In some embodiments anytime a pair of receivers of the virtual boundary device receive signals from the corresponding robotic device, which is programmed to emit wireless signals, substantially simultaneously, the virtual boundary device emits a signal which is received by the robotic device.

In operation, a virtual boundary is established along a virtual line where two receivers of a pair of receivers are able to receive signals from a single origin at the same time. The housing of the receivers is designed in a way such that both receivers can receive signals from a single origin along substantially only on a virtual line. Only when the robotic device is along the virtual boundary will a signal emitted from the robotic device reach both receivers of the virtual boundary device substantially simultaneously. When the robotic device is not positioned along the virtual boundary, then signals emitted from the robotic device cannot reach both receivers of the virtual boundary device at substantially the same time and the robotic device may continue along its established path.

In some embodiments both of the receivers forming the virtual boundary are positioned inside the same housing while in other embodiments each receiver may be positioned in a separate housing wherein each housing is capable of emitting a unique signal upon receiving signals from the corresponding robotic device. When the robotic device is at a virtual boundary formed by a pair of receivers each one of the housings sends out a uniquely modulated signal. Upon receiving at least two different signals from the virtual boundary device substantially simultaneously, the robotic device may be programmed to activate movement patterns to turn away from or otherwise not cross a virtual boundary created by the virtual boundary device. The housing of the receivers is designed in a way such that both receivers can receive signals from a single origin along substantially only one virtual line.

In an alternative embodiment, once the robotic device is located at a virtual boundary line, the robotic device signal will be substantially simultaneously received by a pair of receivers of the virtual boundary device. A controller detects that both receivers are receiving robotic device signal substantially simultaneously and enables a transmitter to send an outbound signal which is received by the robotic device and causes the robotic device to alter its movement path to avoid the virtual boundary. In such embodiments different housings of the virtual boundary device may communicate with each other via wired or wireless means.

Any number of pairs of signal receivers may be provided on virtual boundary device embodiments. In embodiments having only one housing, paired signal receivers may be provided at different angles on the virtual boundary device to create multiple boundaries along different directions. In some embodiments, each pair of signal receivers may be activated or deactivated with a switch activated in response to user input, timers, light sensitivity, motion activity, and the like. Users may customize the virtual boundaries to the specific needs of their environment. In embodiments having only one housing, the position of one or more pairs of signal receivers may be adjustable with pivoting or movable members.

The present invention discloses a method for confining robotic devices to an area, the method comprising: positioning a receiver pair to receive a first robotic device signal substantially simultaneously by each receiver of the receiver pair from the first robotic device only when the first robotic device is positioned along a first virtual boundary; operating the first robotic device to move automatically within an area co-located with the first virtual boundary; transmitting the first robotic device signal by the first robotic device; and receiving the first robotic device signal by the receiver pair thereby indicating that the first robotic device is positioned along the first virtual boundary. The method further comprises altering the first robotic device movement to avoid crossing the virtual boundary in response to receiving the first robotic device signal substantially simultaneously by the receiver pair.

The present invention further discloses a virtual boundary system for robotic devices comprising: at least one robotic device which comprises a robotic transmitter for transmitting a robotic device signal, a robotic receiver for receiving a boundary signal, and a robotic controller for altering movement of the robotic device in response to receiving a first and a second boundary signal substantially simultaneously; at least one virtual boundary device comprising: a first boundary component comprising a first passage terminating at a first receiver, a second boundary component comprising a second passage terminating at a second receiver, the first and the second receivers configured to receive the robotic device signal substantially simultaneously when at least one robotic device is positioned along at least one virtual boundary, a first boundary transmitter for transmitting the first boundary signal in response to receiving the robotic device signal by the first receiver, a second boundary transmitter for transmitting the second boundary signal in response to receiving the robotic device signal by the second receiver of the receiver pair.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION

Figure 1:
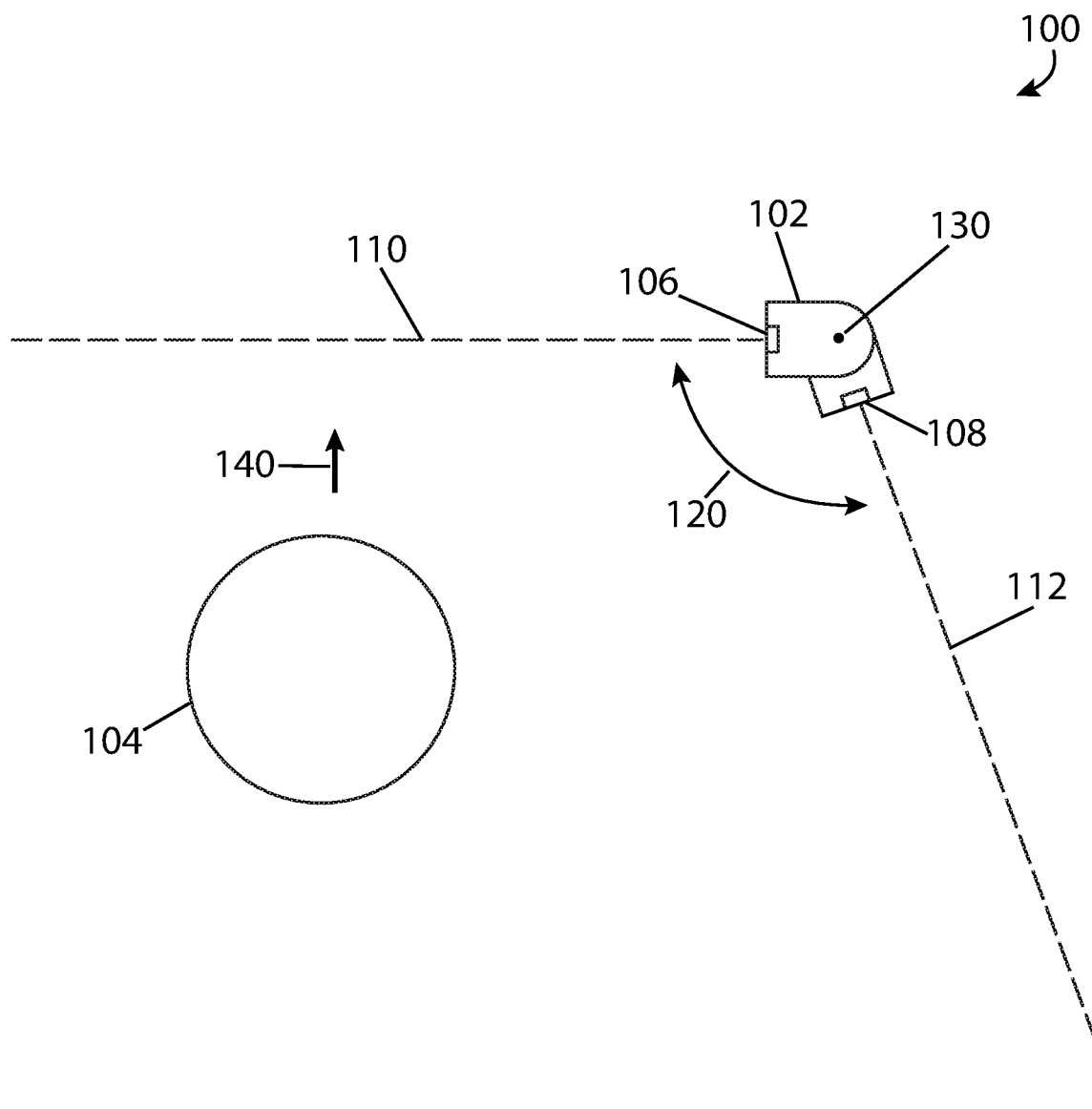
FIG. 1 illustrates an example of the operation of a virtual boundary system embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that generate one or more virtual barriers for restricting or permitting autonomous robotic device movement within or out of a working area.

As understood herein, the term "robot" or "robotic device" may be defined generally to include one or more autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., and one or more clock or synchronizing devices.

In some embodiments, a virtual boundary device having one or more pairs of signal receivers may be placed at a desired location to establish a virtual boundary. Anytime a first receiver from the pair of receivers of the virtual boundary device receives a signal from a corresponding robotic device, which is programmed to emit wireless signals, the virtual boundary device emits a first signal, which is received by the corresponding robotic device. Anytime a second receiver of the pair of receivers of the virtual boundary device receives a signal from the corresponding robotic device, the virtual boundary device emits a second signal, which is received by the corresponding robotic device. Upon receiving the first signal and the second signal from the virtual boundary device substantially simultaneously, the robotic device may be programmed to activate movement patterns to turn away from or otherwise not cross a virtual boundary created by methods disclosed herein.

In alternative embodiments, anytime a pair of receivers of the virtual boundary device receive signals from the corresponding robotic device, which is programmed to emit wireless signals, substantially simultaneously, the virtual boundary device emits a signal, which is received by the robotic device.

In operation, a virtual boundary is established along a virtual line where a set of receivers are able to receive signals from a single origin at substantially the same time. The housing of the receivers is designed in a way such that both receivers can receive signals from a single origin along substantially only one virtual line. Only when the robotic device is along the virtual boundary will a signal emitted from the robotic device reach both receivers of the virtual boundary device at the same time. When the robotic device is not positioned along the virtual boundary, the signals emitted from the robotic device cannot reach both receivers of the virtual boundary device at the same time and the robotic device may continue along its established path.

In some embodiments, both of the receivers forming the virtual boundary are positioned inside the same housing while in other embodiments each receiver may be positioned in a separate housing wherein each housing is capable of emitting a unique signal upon receiving signals from the corresponding robotic device. When the robotic device is at a virtual boundary formed by a pair of receivers, each one of the housings sends out a uniquely modulated signal. Upon receiving at least two unique signals from the virtual boundary device substantially simultaneously, the robotic device may be programmed to activate movement patterns to turn away from or otherwise not cross a virtual boundary created by the virtual boundary device. The housing of the receivers is designed in a way such that both receivers can receive signals from a single origin along substantially only one virtual line.

In an alternative embodiment, once the robotic device is located at a virtual boundary line, the robotic device signal will be received substantially simultaneously by a pair of receivers of the virtual boundary device. A controller detects that both receivers are receiving robotic device signal substantially simultaneously and enables a transmitter to emit an outbound signal, which is received by the robotic device causing it to avoid the virtual boundary.

In such embodiments, if the virtual boundary device has more than one housing, different housings of the virtual boundary device may communicate with each other via a wired or wireless means.

Any number of pairs of signal receivers may be provided on virtual boundary device embodiments. In embodiments having only one housing, paired signal receivers may be provided at different angles on the virtual boundary device to create multiple boundaries along different directions. In some embodiments, each pair of signal receivers may be activated or deactivated with a switch activated in response to user input, timers, light sensitivity, motion activity, and the like. Users may customize the virtual boundaries to the specific needs of their environment. In embodiments having only one housing, the position of one or more pairs of signal receivers may be adjustable with pivoting or movable members.

The present invention discloses a method for confining robotic devices to an area, the method comprising: positioning a receiver pair to receive a first robotic device signal substantially simultaneously by each receiver of the receiver pair from a first robotic device only when the first robotic device is positioned along a first virtual boundary; operating the first robotic device to move automatically within an area co-located with the first virtual boundary; transmitting the first robotic device signal by the first robotic device; and receiving the first robotic device signal by the receiver pair when the first robotic device is located on the first virtual boundary, thereby indicating that the first robotic device is positioned along the first virtual boundary. The method further comprises altering the first robotic device movement to avoid crossing the virtual boundary in response to receiving the first robotic device signal substantially simultaneously by the receiver pair.

The present invention further discloses a virtual boundary system for robotic devices comprising: at least one robotic device which comprises a robotic transmitter for transmitting a robotic device signal, a robotic receiver for receiving a boundary signal, and a robotic controller for altering movement of the robotic device in response to receiving a first and a second boundary signal substantially simultaneously; at least one virtual boundary device comprising: a first boundary component comprising a first passage terminating at a first receiver, a second boundary component comprises a second passage terminating at a second receiver, the first and the second receivers configured to receive the robotic device signal substantially simultaneously when at least one robotic device is positioned along at least one virtual boundary, a first boundary transmitter for transmitting the first boundary signal in response to receiving the robotic device signal by the first receiver, a second boundary transmitter for transmitting the second boundary signal in response to receiving the robotic device signal by the second receiver of the receiver pair.

In an alternative embodiments, the virtual boundary system for robotic devices comprises: at least one robotic device each comprising, a robotic transmitter for transmitting a robotic device signal, a robotic receiver for receiving a boundary signal, and a robotic controller for altering movement of the robotic device in response to receiving the boundary signal; at least one virtual boundary device each comprising, at least one boundary component having passages and a receiver pair, the receiver pair configured to receive the robotic device signal substantially simultaneously by each receiver of the receiver pair when the at least one robotic device is positioned along at least one virtual boundary, a boundary transmitter for transmitting the boundary signal in response to receiving the robotic device signal substantially simultaneously.

Preferably one or more virtual boundary devices having one or more transmitters, pair of receivers or transceivers are provided to be portable and self-powered. In embodiments, a user may easily position a virtual boundary device in order to create a virtual boundary for the robotic device. The robotic device detects the position of the virtual boundary when it approaches it through communication between the robotic device and the virtual boundary device. Once the robotic device has detected its close proximity to the boundary it will change direction to avoid crossing the boundary.

In different embodiments, passages used to limit the signal reception range of receivers may have different forms such as apertures or projecting members etc. and all embodiments may have passages made of reflective material or be equipped with baffles to further limit the signal reception range. It would be obvious to one skilled in the art that in embodiments mentioned below, the apertures and projecting members can be used interchangeably without departing from the innovative concept. The embodiments mentioned below are just for the purpose of illustration and explanation of the inventive concept of the invention, hence in any of embodiments either apertures and projecting members can be used interchangeable or even together.

FIG. 1 illustrates an example of the operation of virtual boundary system 100 embodying features of the present invention. Virtual boundary device 102 may be placed in a position where the user desires to restrict the movement of robotic device 104. Virtual boundary device 102 may have one or more paired receivers that establish virtual boundaries. As illustrated, two sets of paired receivers 106 and 108 are configured for providing virtual boundaries. As may be seen, receiver pair 106 establishes virtual boundary 110 and receiver pair 108 establishes a virtual boundary 112. Receiver pairs 106 and 108 may be either active devices, which send and receive signals or passive devices, which only receive signals in order to establish virtual boundaries. As illustrated, receiver pairs 106 and 108 may be pivotally coupled with virtual boundary device 102 such that a user may adjust the respective positions and angles of virtual boundaries 110 and 112 about pivot point 130.

As illustrated, robotic device 104 may, in the course of executing a coverage pattern for a work area, move in direction 140 toward virtual boundary 110. When robotic device 104 is positioned approximately along virtual boundary 110, receiver pair 108 may substantially simultaneously receive a signal emitted by robotic device 104 and virtual boundary device 102 may send a signal to robotic device 104 to take an appropriate action to avoid crossing boundary 110.

In embodiments, the robotic device may alter its movement in any number of ways such as, stopping, slowing, reversing, and changing course without limitation. In embodiments, other appropriate actions may include triggering an algorithm or marking the present location as a boundary on a map without limitation. In further embodiments, methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room.

In some embodiments, receiver pairs 106 and 108 are passive devices, which receive signals in order to establish a boundary. Receiver pairs 106 and 108 may each be comprised of two focused receivers that are able to receive a signal from robotic devices along substantially a single virtual boundary or plane, which separates a desired robot work area from an area where the robotic device is prohibited. In an embodiment, receiver pairs 106 and 108 are each comprised of a pair of receivers positioned such that a signal may only be received at both receivers substantially simultaneously when the origin of the signal is substantially along the virtual boundary or plane.

The general method of operation of embodiments may now be disclosed. In embodiments, robotic devices may provide a continuous, semi-continuous, or pulsed robotic device signal as the robotic device moves about in its assigned work area. Each receiver pair of a virtual boundary device may be monitored for detection of a robotic device signal. When both receivers of a receiver pair substantially simultaneously detect a robotic device signal, the robotic device emitting the robotic device signal will be positioned along a virtual boundary established by the receiver pair. The virtual boundary device will then emit a boundary signal, which is received by the robotic device. When the robotic device receives the boundary signal, its movement is adjusted to avoid further forward moving, thus avoiding crossing the virtual boundary. In embodiments, the robotic device may alter its movement in any number of ways such as, stopping, slowing, reversing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room.

In some embodiments, receiver pairs may be configured to receive robotic device signals constantly. In other embodiments receiver pairs may be configured to receive robotic device signals only on a desired schedule. In addition, in some embodiments, the robotic device signal may be configured to transmit only on a desired schedule. Furthermore, in embodiments, the boundary signal may be configured to transmit only on a desired schedule. In this manner, a robotic device may turn away from a virtual boundary at designated times (such as during work hours), but ignore the virtual boundary at other times (such as during off hours).

Figure 2:
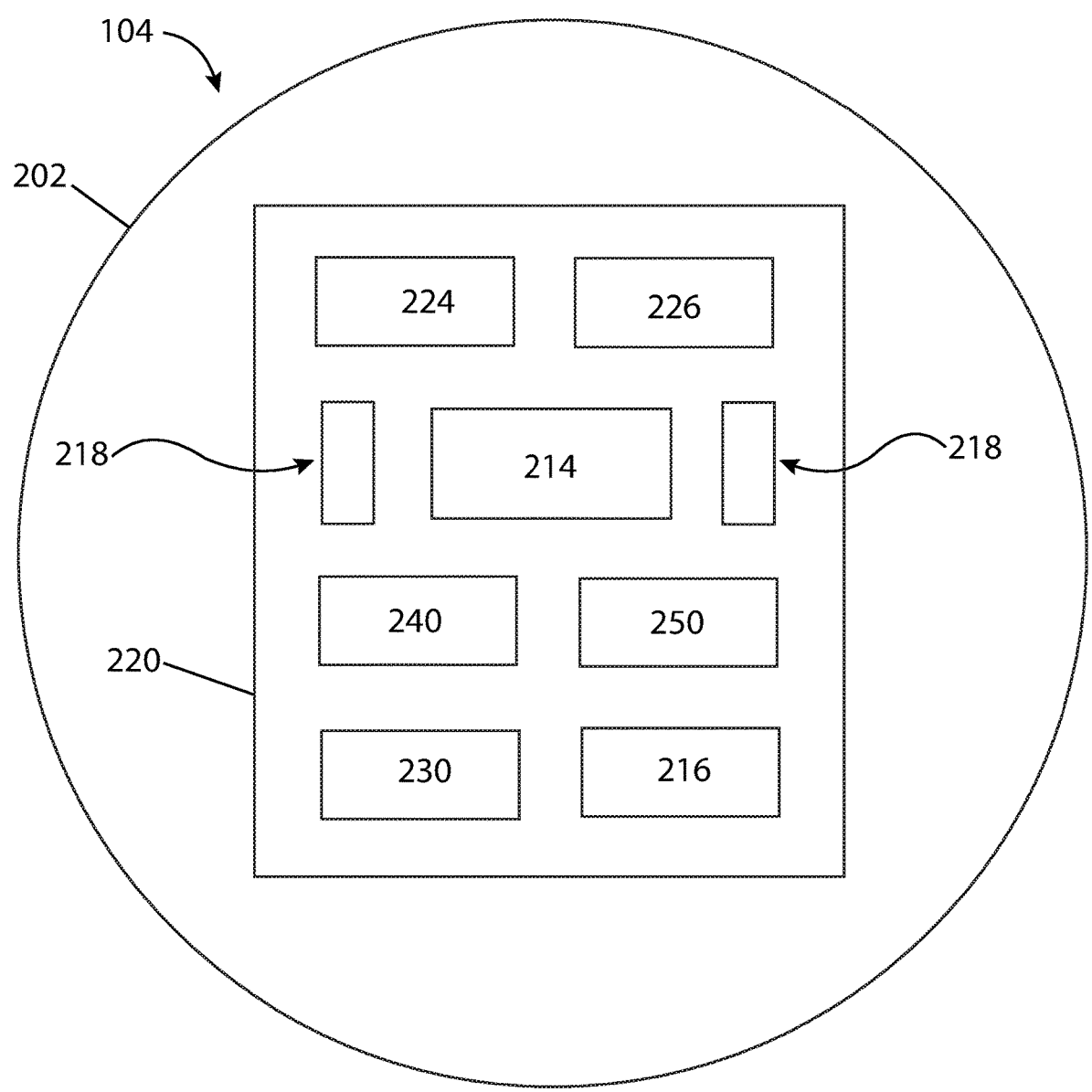
FIG. 2 illustrates a robotic device embodying features of the present invention.

FIG. 2 illustrates robotic device 104 embodying features of the present invention and having the type and functionality of a sample representative robotic device. As illustrated, robotic device 104 may include without limitation casing or shell 202, chassis 220, wheels 218, motor 214 for driving wheels 218, receiver 216 that detects transmitted signals, processor 224 and/or controller 226 to process and/or control motor and other robotic autonomous operations, network or wireless communications, power management, etc., and one or more clock or synchronizing devices 230. Device 104 may additionally include local digital memory or accessible storage unit 240 and wireless sonar/radio sensor and/or telecommunications transceiver 250 for mobile communication interface with a network or other wireless communication device, or boundary transceivers.

Figure 3:
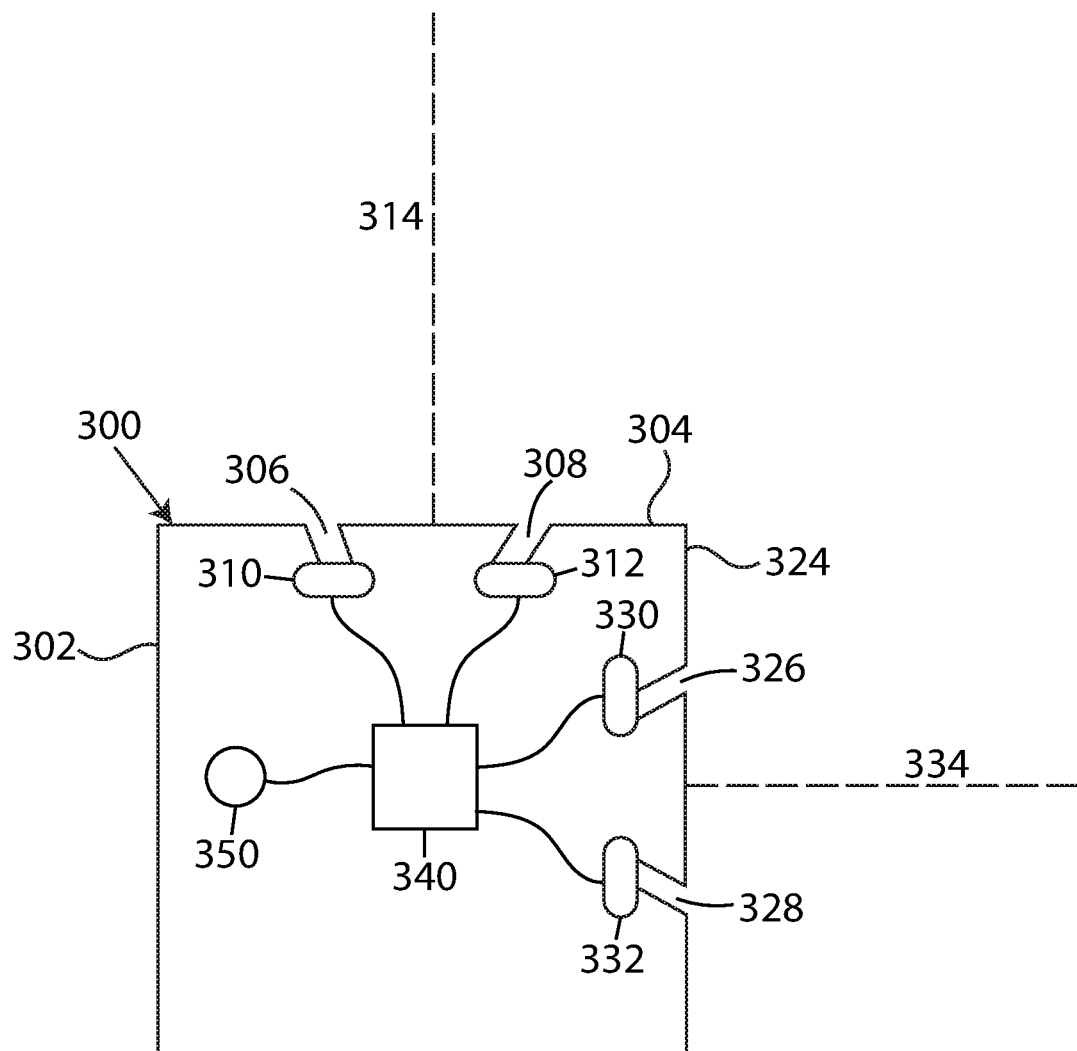
FIG. 3 illustrates a virtual boundary device embodying features of the present invention.

FIG. 3 illustrates virtual boundary device 300 embodying features of the present invention. As illustrated, virtual boundary device 300 may include housing 302. Within housing 302, receivers 310 and 312 are each located at the terminal end of each of apertures 306 and 308 respectively. Receivers 310 and 312 together make up a receiver pair. The combination of apertures and receiver pair may be termed a virtual boundary component. Apertures 306 and 308 extend from surface 304 to receivers 310 and 312 at an angle with respect to a centerline of housing 302. The angle utilized prevents receivers 310 and 312 from substantially simultaneously receiving a signal unless the signal is emitted from a point along a line as illustrated by line 314. Thus, when a robotic device emitting a robotic device signal is positioned along virtual boundary 314, receiver pair 310 and 312 may substantially simultaneously receive a signal and thereby the robotic device may be caused to avoid the virtual boundary. In embodiments, the robotic device may avoid the virtual boundary by altering its movement in any number of ways such as, stopping, slowing, reversing, and changing course without limitation. In embodiments, other appropriate actions may include triggering an algorithm or marking the present location as a boundary on a map without limitation. In further embodiments, methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room. In some embodiments, receiver pairs may be configured for receiving various signals such as, for example: infrared, laser, radio frequency, wifi, sonar, or any other suitable wireless signal sent by a robotic device. In some embodiments, the apertures 306, 308 are set at an angle with respect to a boundary line 314. In some embodiments, passage angles may be in a range of approximately −90 to 90 degrees with respect to a virtual boundary line and preferably approximately −45 to 45 degrees with respect to a virtual boundary line. In addition, in embodiments, passage angles between sensors may be the same, may be inversely related, or may be different from each other without limitation.

In like manner, within housing 302, receivers 330 and 332 are each located at the terminal end of each of apertures 326 and 328 respectively. Apertures 326 and 328 extend from surface 324 to receivers 330 and 332 at an angle. The angle utilized prevents receivers 330 and 332 from substantially simultaneously receiving a signal unless the signal is emitted from a position along a line as illustrated by line 334. Thus, when a robotic device emitting a robotic device signal is positioned along virtual boundary 334, receivers 330 and 332 may substantially simultaneously receive a signal and thereby the robotic device may be caused to avoid the virtual boundary. In embodiments, receiver pairs may be configured for receiving various signals such as, for example: infrared, laser, radio frequency, wifi, sonar, or any other suitable wireless signal sent by a robotic device. In embodiment, the apertures 326 are set at an angle with respect to a boundary line 334.

Referring briefly to both FIGS. 2 and 3, in embodiments, apertures 306 and 308 as well as receivers 310 and 312 may be positioned at substantially the same height as a transceiver 250 of robotic device 104 for improved reception of the signal from the robotic device. Likewise, in embodiments, apertures 326 and 328 as well as receivers 330 and 332 may be positioned at substantially the same height as a transceiver 250 of robotic device 104 for improved reception of the signal from the robotic device.

It should be understood that any number of receiver pairs may be provided within a virtual boundary device to create any number of virtual boundaries.

Returning to FIG. 3, virtual boundary device 300 may include a controller 340 which may be electrically coupled with each of receiver 310, 312, 330, and 332. Further, transmitter 350 may be electrically coupled with controller 340. Transmitter 350 may be a transmitter for infrared, laser, radio frequency, wifi, sonar or other suitable wireless transmitter, which is compatible with a signal, which may be received by the robotic device. Controller 340 may function to detect whether both receivers of any receiver pair substantially simultaneously receive an incoming signal. Any time both receivers of a receiver pair substantially simultaneously receive an incoming signal, controller 340 enables transmitter 350 to transmit boundary signals, which may be received by a robotic device positioned along a virtual boundary and which may be programmed to alter its movement path upon receipt of the boundary signal. The controller 340 may be implemented with AND gate logic circuits. Other implementations may also be used, such as processor based controllers.

In embodiments, housings may be constructed of a type of material and a thickness which effectively absorbs the robotic device signal. Alternatively, the circuit 340 may monitor the signal strength of the robotic device signal at each receiver and only enables the transmitter when the signal strength received by each receiver exceeds a threshold amount which indicates that the robotic device signal is passing through both apertures to the respective receivers (rather than reflecting off the walls of the apertures, for example).

Figure 4:
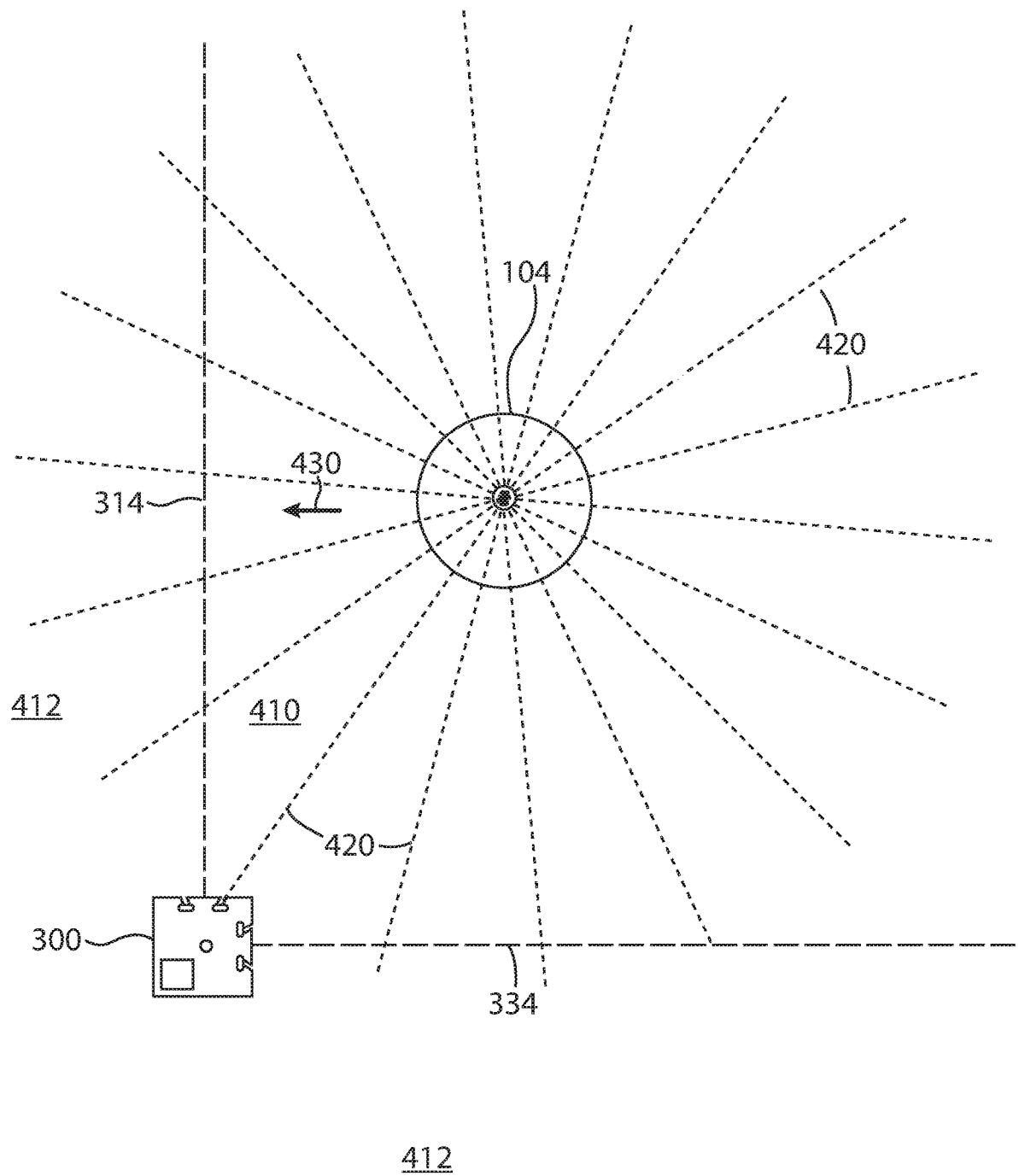
FIG. 4 illustrates the operation of a robotic device approaching a virtual boundary embodying features of the present invention.

FIG. 4 illustrates an overhead view of the operation of robotic device 104 approaching virtual boundary 314 embodying features of the present invention. The method will now be described. Virtual boundary device 300 may be positioned to establish virtual boundaries or planes 314 and 334. Virtual boundaries 314 and 334 apportion an area into a robotic device work area 410 and out of bounds area 412. In operation, robotic device 104 may be enabled to cover a surface area in a defined or random pattern. As such, robotic device 104 may move within the work area 410 co-located with virtual boundary 314. During movement, robotic device 104 may be configured to emit a continuous, semi-continuous, or pulsed robotic device signal 420 from its transceiver 250 (see FIG. 2). In embodiments, robotic device signals may include infrared, laser, radio frequency, wife, sonar or other suitable wireless signal type.

Further, during movement, robotic device 104 may travel along direction 430 toward virtual boundary 314. As shown in FIG. 4, the robotic device 104 is still located a distance from virtual boundary 314. At the position illustrated, robotic device signal 420 is only being received by one receiver of a receiver pair associated with boundary 314. As such, a controller in virtual boundary device 300 detects that only one of receiver pair is receiving robotic device signal 420 and does not enable transmission of a boundary signal.

Figure 5:
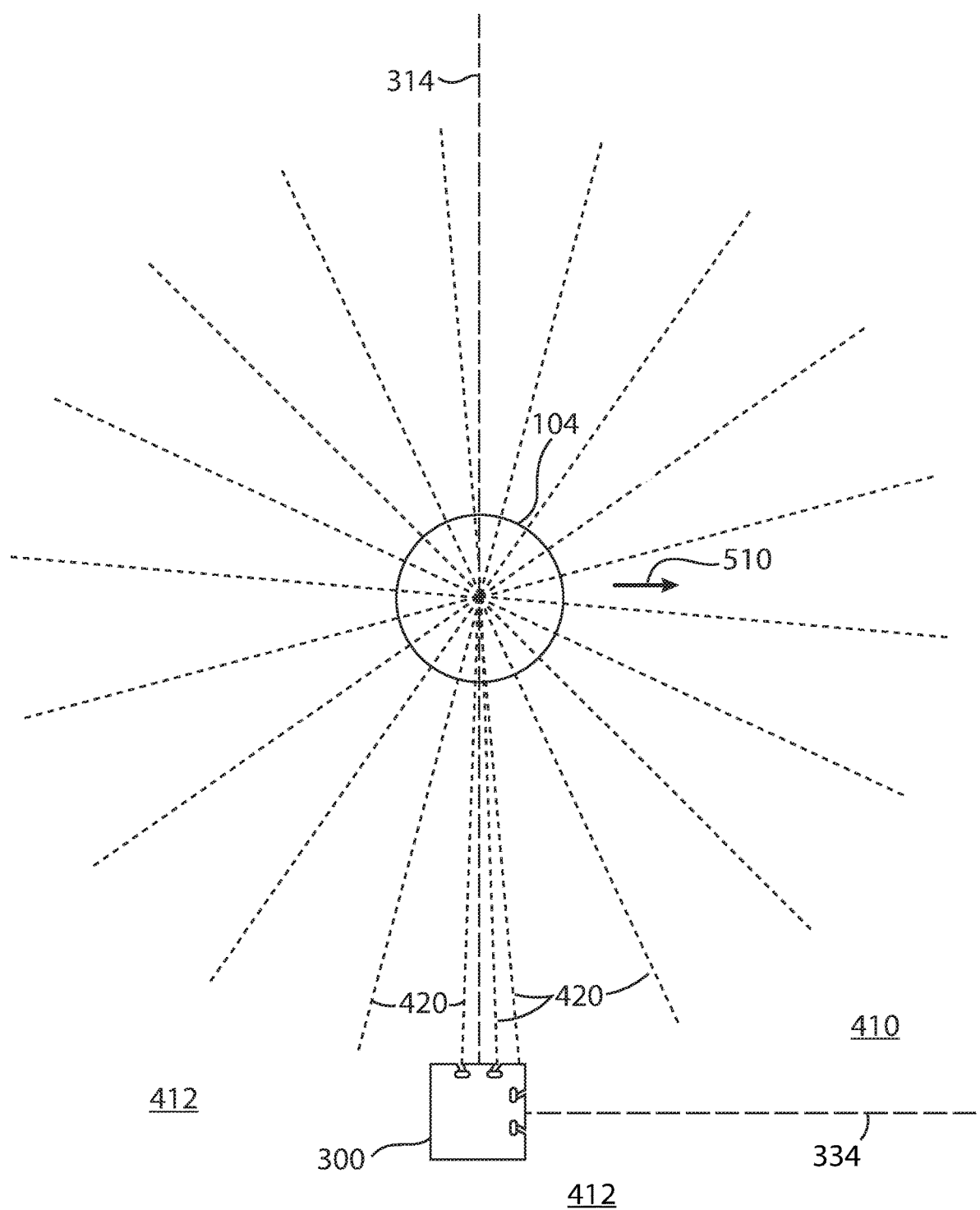
FIG. 5 illustrates the operation of a robotic device intersecting a virtual boundary embodying features of the present invention.

FIG. 5 illustrates an overhead view of the operation of robotic device 104 intersecting virtual boundary 314 embodying features of the present invention. Once robotic device 104 is located at virtual boundary 314, robotic device signal 420 is substantially simultaneously received by a receiver pair of virtual boundary device 300. A controller detects that both receivers of a receiver pair are receiving robotic device signal 420. The controller then enables a transmitter to send an outbound signal to robotic device 104. Robotic device 104 receives the boundary signal and its controller instructs the robotic device 104 to alter its movement to avoid crossing virtual boundary 314. As an illustrated example, robotic device 104 may reverse its path and proceed in direction 510. As robotic device 104 moves away from virtual boundary 314, both receivers of a receiver pair are no longer substantially simultaneously receiving robotic device signal 420. The virtual boundary device controller detects the lack of a signal at the receiver pair and the virtual boundary device controller then terminates the boundary signal. Thus, the robotic device is prevented from crossing the virtual boundary 314 and equally prevented from covering out of bounds area 412.

Figure 6:
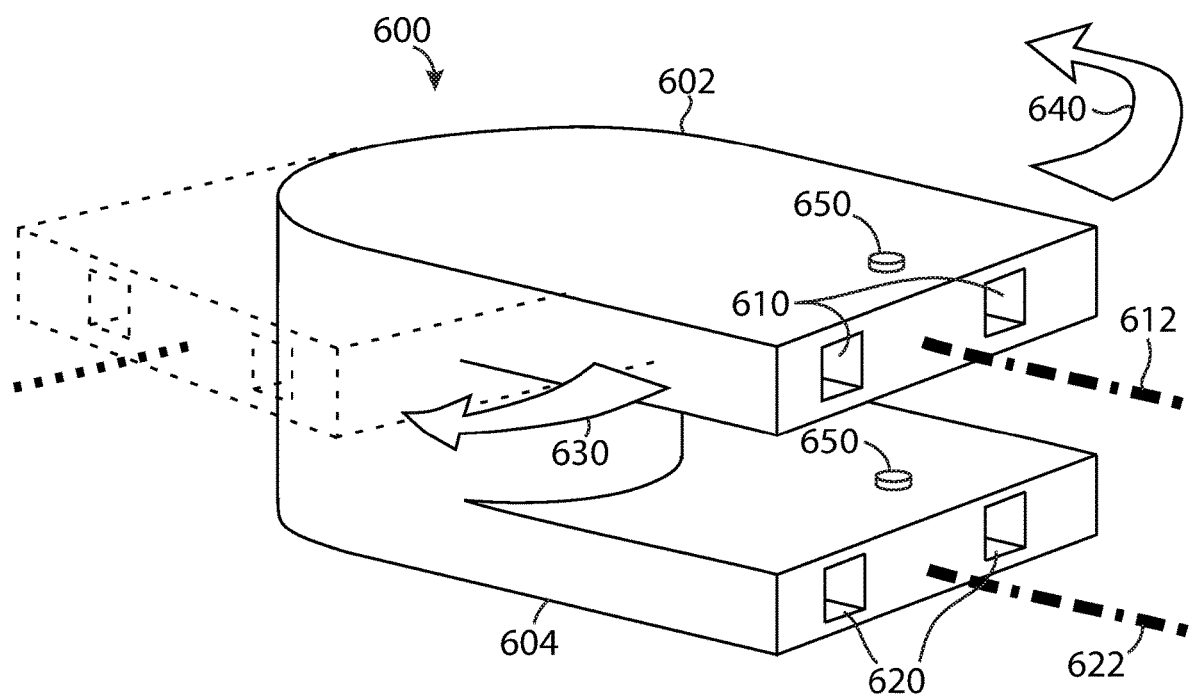
FIG. 6 illustrates an embodiment of a virtual boundary device embodying features of the present invention.

FIG. 6 illustrates a perspective view of an embodiment of virtual boundary device embodying features of the present invention. As illustrated, virtual boundary device 600 is rotatably adjustable. Further illustrated, upper portion 602 is rotatably coupled with lower portion 604. Upper portion 602 has a pair of apertures 610 and each aperture terminates at a receiver (not shown). The receivers of apertures 610 are a receiver pair. Apertures 610 and corresponding receiver pair are configured similar to the embodiments described above such that they define a virtual boundary 612. Lower portion 604 also has apertures 620 and each aperture 620 terminates at a receiver (not shown). Apertures 620 and corresponding receiver pair are configured to define virtual boundary 622. Virtual boundary device 600 may also include a controller and transmitter similar to those previously described above.

In operation, a user may rotate upper portion 602 in direction 630 or 640 relative to bottom portion 604. In this manner, virtual boundary 612 may be adjusted relative to virtual boundary 622. This configuration allows users to customize the angle between virtual boundaries to fit the particular needs of a working environment. In some embodiments, virtual boundaries may be activated and deactivated through a switch or button 650 that activates and deactivates the corresponding receiver pairs. Switch 650 may control a switch located between the power source and the receiver set.

Figure 7:
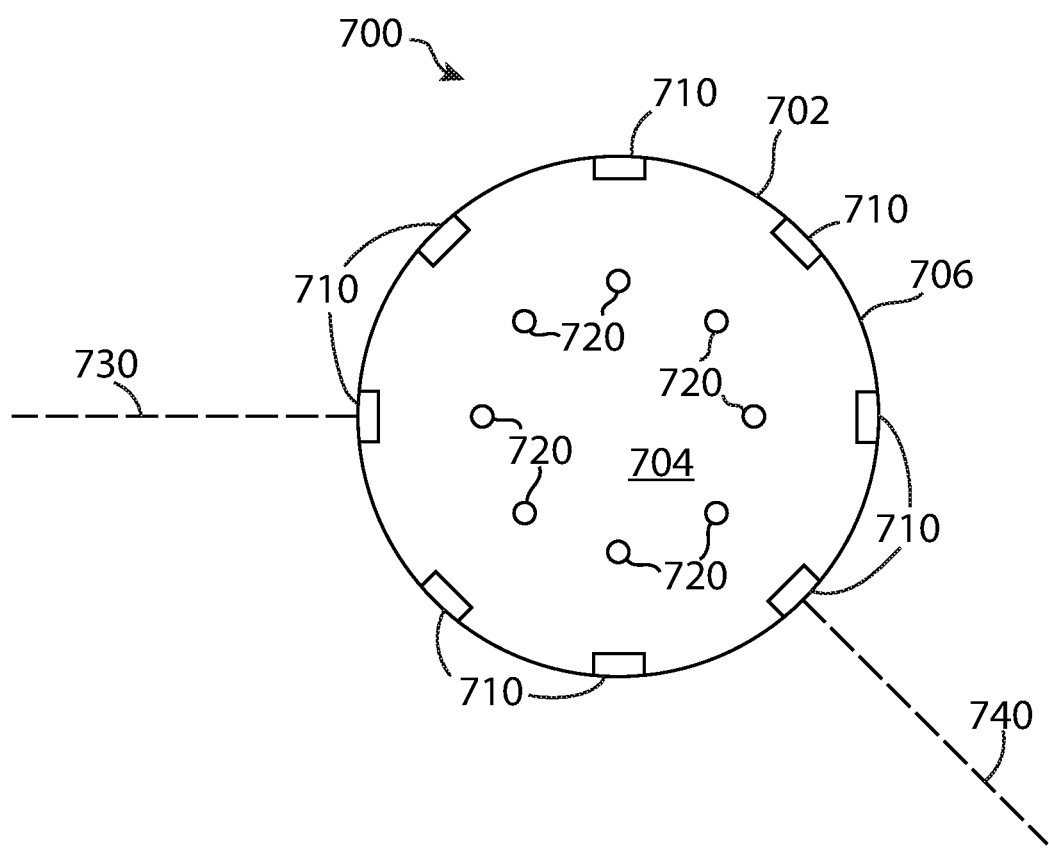
FIG. 7 illustrates an embodiment of a virtual boundary device embodying features of the present invention.

FIG. 7 illustrates an embodiment of virtual boundary device 700 embodying features of the present invention. As illustrated, virtual boundary device 700 includes cylindrically shaped housing 702. Housing 702 includes top surface 704 and side surface 706. Side surface 706 includes a number of virtual boundary components 710 positioned along the circumference of housing 702. Each virtual boundary component includes a pair of apertures and receivers similar to those described above. A plurality of buttons 720 may be positioned along top surface 704. Each button may be associated with one of the virtual boundary components 710. The button may control a switch located between a power source and the receivers located within the respective virtual boundary component 710. A user may selectively enable different virtual boundary components to configure the appropriate virtual boundaries for the robotic device. FIG. 7 illustrates an example where two of the virtual boundary components are enabled, thereby defining two virtual boundaries 730 and 740. Other configurations are possible by enabling or disabling selected buttons 720 as desired.

The number and positioning of sets of receivers may vary and is not limited. The designs shown are for illustration purposes only and are not meant to be restrictive. Various types of wireless signals, such as infrared light, laser, radio frequencies, wifi signals, sonar signals, light, sound waves, global positioning signal, cellular communication device transmissions, magnetic field signal, or any other available wireless signal may be used for sending signals from the robotic device to the transceiver and for sending signals from the transceiver's emitter to the robotic device.

Figure 8:
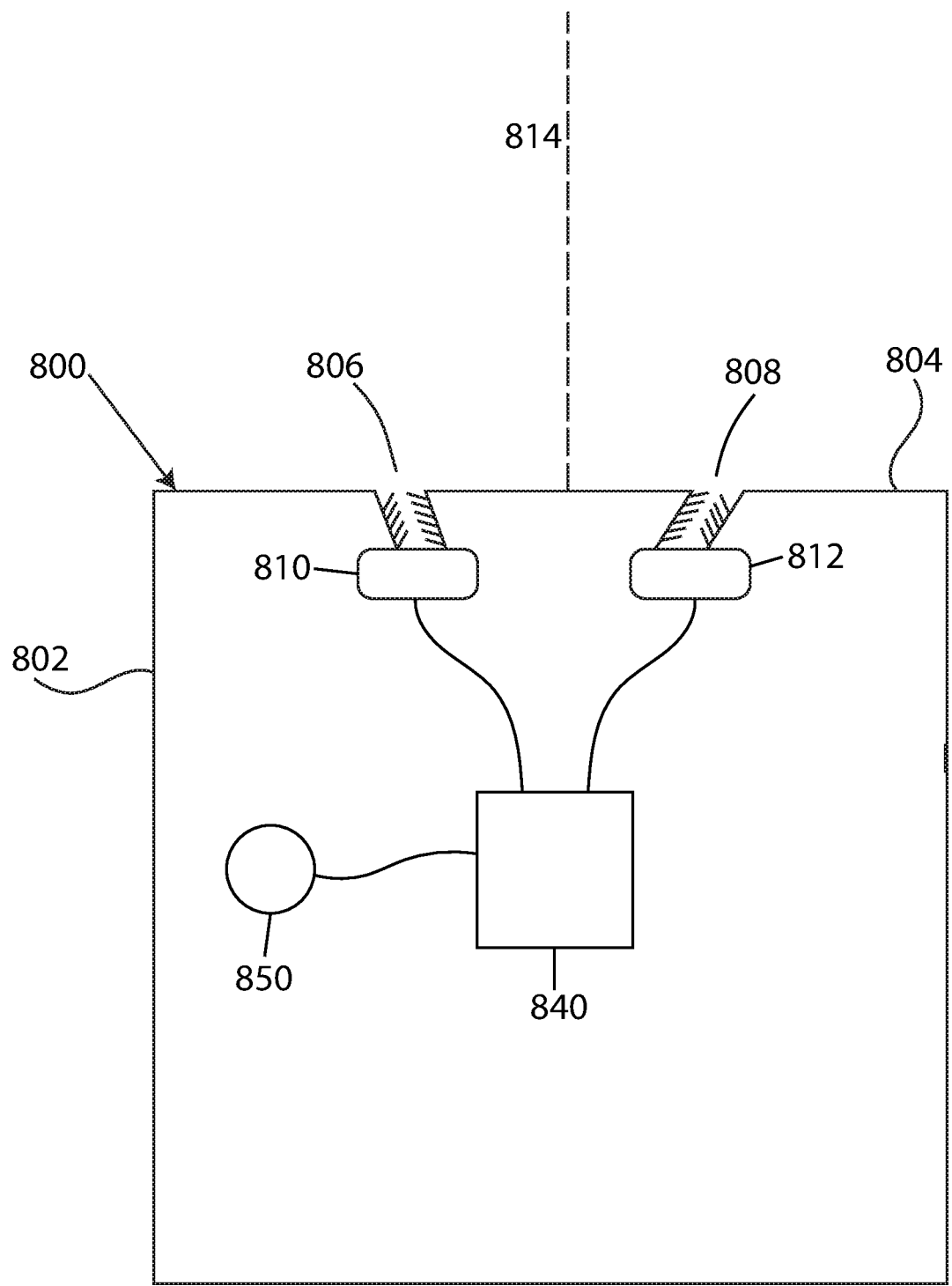
FIG. 8 illustrates an embodiment of a virtual boundary device embodying features of the present invention.

FIG. 8 illustrates a virtual boundary device embodying features of the present invention. As illustrated, virtual boundary device 800 may include housing 802. Within housing 802, receivers 810 and 812 are each located at the terminal end of each of passages 806 and 808 respectively. The combination of passages and the receiver pair may be termed a virtual boundary component. Passages 806 and 808 extend from surface 804 to receivers 810 and 812 at an angle. The angle utilized prevents the receiver pair comprised of receivers 810 and 812 from substantially simultaneously receiving a signal unless the signal is emitted from a robotic device positioned along a line as illustrated by line 814. Thus when a robotic device emitting a robotic device signal is positioned along virtual boundary 814, receiver pair 810 and 812 may substantially simultaneously receive a signal and thereby the robotic device may be caused to avoid the virtual boundary.

Further illustrated are a number of baffles 824 positioned along the walls of passages 806 and 808. Baffles may be utilized to further narrow the reception range of receive pair 810 and 812 and reduce reception of signals reflected off the walls of passages 806 and 808 by receivers 810 and 812. Baffles may be angled toward the openings of passages. In embodiments, baffles may be manufactured from signal absorbing materials or signal reflective materials without limitation. In further embodiments, baffles may be angled with respect to the angle of the passages within a range of approximately 10 to 60 degrees, more preferably 40 degrees. As may be appreciated, different angles may impart different signal reception characteristics.

In embodiments, the robotic device may avoid the virtual boundary by altering its movement in any number of ways such as, stopping, slowing, reversing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now operating in that room. In embodiments, receiver pairs may be configured for receiving various signals such as, for example: infrared, laser, radio frequency, wifi, sonar, light, sound waves, global positioning signal, cellular communication device transmissions, magnetic field signal, or any other suitable wireless signal sent by a robotic device. In embodiments, the passages 806 and 808 are set at an angle with respect to a virtual boundary line. Passage angles may be in a range of approximately −90 to 90 degrees with respect to a virtual boundary line, and preferably approximately −45 to 45 degrees with respect to a virtual boundary line. In addition, in embodiments, passage angles between sensors may be the same, may be inversely related, or may be different from each other without limitation.

Further illustrated is passage 820 and receiver 822. As illustrated, passage 820 may be positioned between passage 806 and passage 808. Unlike passages 806 and 808, passage 820 is not angled. Rather passage 820, in embodiments, may be substantially parallel with respect to virtual boundary 814. In embodiments, an additional receiver may provide additional control inputs. For example, in an embodiment, when a signal is received at receivers 812 and 822[1], an instruction may be transmitted to a robotic device as, for example, "slow" or "begin turn." Likewise, when a signal is received at receivers 810 and 822 [2], a further instruction may be transmitted to a robotic device. In this manner, a robotic device may be more finely tuned to operate within a virtual boundary.

Returning to FIG. 8, virtual boundary device 800 may include a controller 840 which may be electrically coupled with each of receiver 810, 812, and 822. Further, transmitter 850 may be electrically coupled with controller 840. Transmitter 850 may be a transmitter for infrared, laser, radio frequency, wifi, sonar, light, sound waves, global positioning signal, cellular communication device transmissions, magnetic field signal, or other suitable wireless transmitter, which is compatible with a signal, which may be received by the robotic device. Controller 840 may function to detect whether both receivers of any receiver pair substantially simultaneously receives an incoming signal. Any time a receiver pair substantially simultaneously receives an incoming signal controller 840 enables transmitter 850 to transmit boundary signals, which may be received by a robotic device positioned along a virtual boundary and which may be programmed to alter its movement path upon receipt of the boundary signal. The controller 840 may be implemented with AND gate logic circuits. Other implementations may also be used, such as processor based controllers.

In embodiments, housings may be constructed of a type of material and a thickness which effectively absorbs the robotic device signal. Alternatively, the circuit 840 may monitor the signal strength of the robotic device signal at each receiver and only enables the transmitter when the signal strength from both receivers exceeds a threshold amount, which indicates that the robotic device signal is passing through both passages to the respective receivers.

It may be appreciated that robotic device embodiments disclosed herein may be autonomous, semi-autonomous, or remote controlled. That is, robotic device embodiments are not limited in response to virtual boundary systems provided herein. For example, a robotic device may, upon reaching a steep turn, engage a semiautonomous vehicle on a track to navigate the steep turn. It may be further appreciated that many types of coordination with systems provided herein may be contemplated.

FIGS. 9A, 9B, 10, 11, 12 and 13 illustrate virtual boundary devices embodying features of the present invention. As noted above, in embodiments, passages may be at various angles with respect to a virtual boundary line. In embodiments, passage angles may be in a range of approximately −90 to 90 degrees with respect to a virtual boundary line and preferably approximately −45 to 45 degrees with respect to a virtual boundary line. In addition, in embodiments, passage angles between sensors may be the same, may be inversely related, or may be different from each other without limitation.

It should be appreciated that the boundary lines shown schematically in these figures are not theoretical lines and have a certain width that could increase based on the distance from the receivers. Also, it would be obvious to one skilled in the art that the accuracy of a virtual boundary device is dependent on the specific manufacturing practices and materials and sensors used and could be increased by use of, for example, anti reflection material in the passages leading to receivers.

Figure 9A:
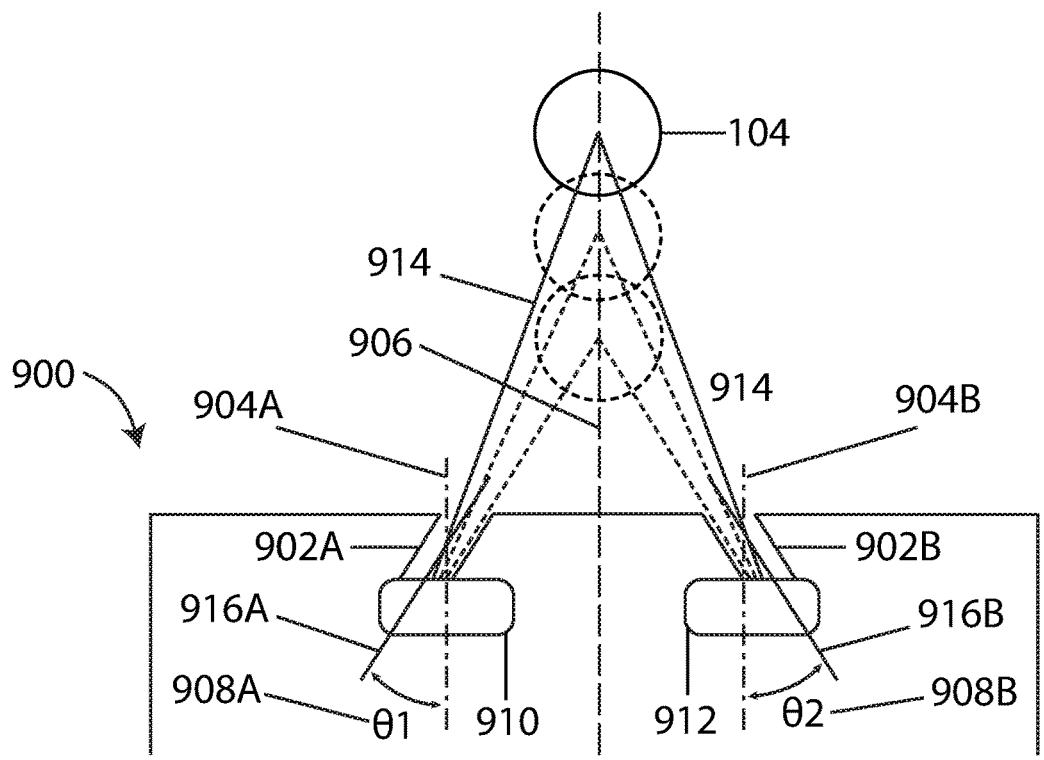
FIG. 9A and FIG. 9B illustrate a virtual boundary device with passages angled inward embodying features of the present invention.

FIG. 9A illustrates a virtual boundary device 900 that may include a pair of passages 902A and 902B, which passages may be inwardly facing with respect to virtual boundary line 906 and receivers 910 and 912 each positioned at the end of their respective passage. Lines 904A and 904B are parallel with virtual boundary line 906 and are provided for reference. Lines 916A and 916B are parallel with the passages 902A and 902B, respectively, and are provided for reference. As illustrated, passage 902A is angled at θ1 908A and may receive signals 914 from the robotic device 104 from a range of angles. Likewise, passage 902B is angled at θ2 908B and may receive signals 914 from the robotic device 104 from a range of angles. As shown in this figure, signals 914 may only be received substantially simultaneously at both receivers 910 and 912 when the robotic device 104 is substantially along the virtual boundary or plane herein shown by a schematic line 906. The angle at which signals 914 enter the passages will differ based on the distance of the robotic device 104 from the receivers 910 and 912, but apertures 902A and 902B are adapted to only let signals 914 substantially simultaneously reach both receivers 910 and 912 when the robotic device is located substantially along the virtual boundary 906.

Figure 9B:
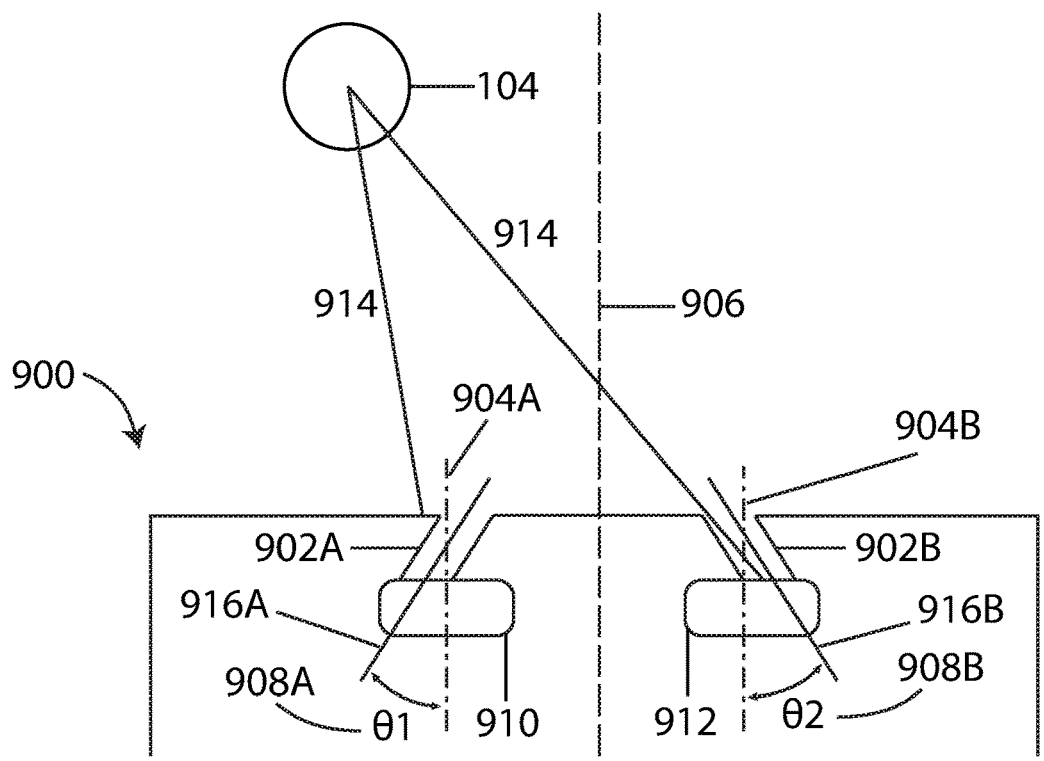

FIG. 9B shows the virtual boundary device 900 when the robotic device 104 is not along the virtual boundary line 906. As illustrated, in this position, signals 914 emitted from the robotic device 104 may reach substantially only one of the receivers 910 and 912.

Figure 10:
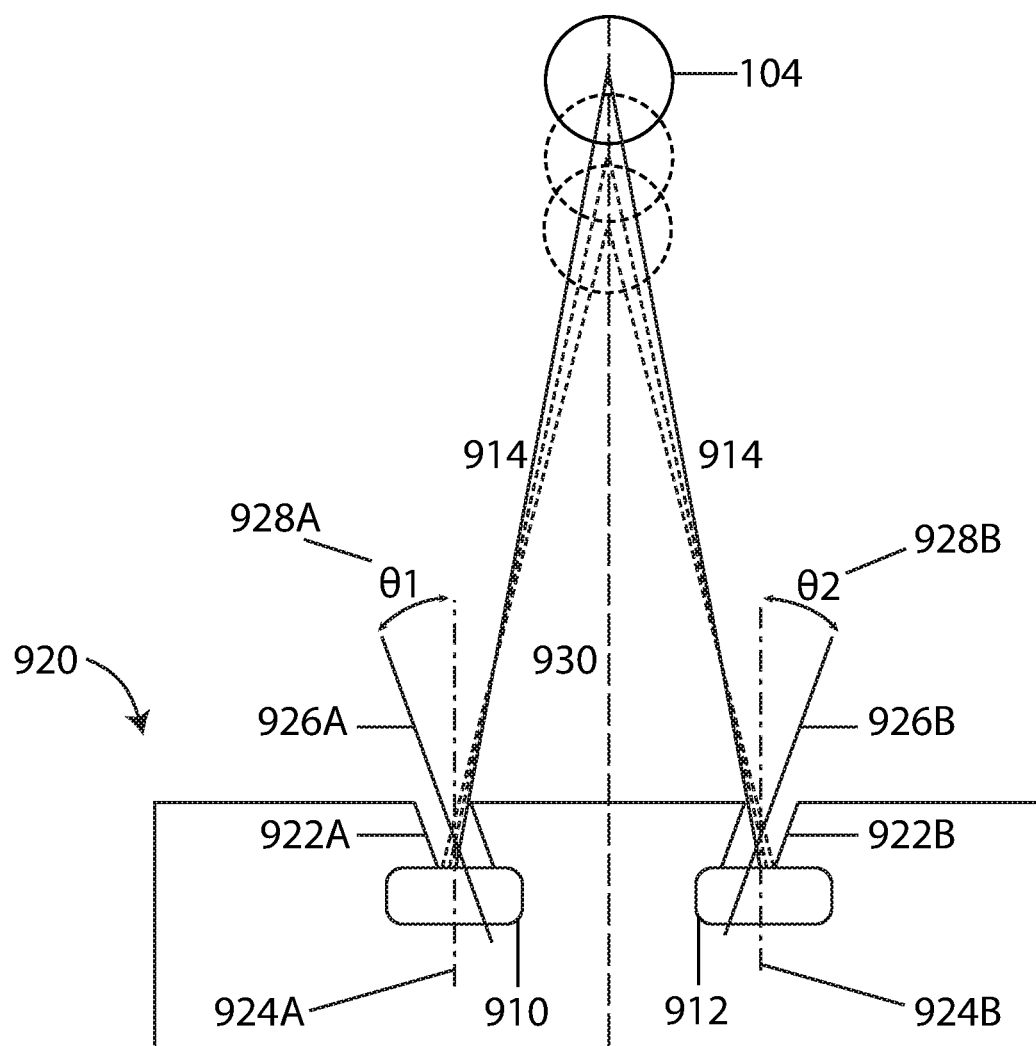
FIG. 10 and FIG. 11 illustrate a virtual boundary device with passages angled outward embodying features of the present invention.
Figure 11:
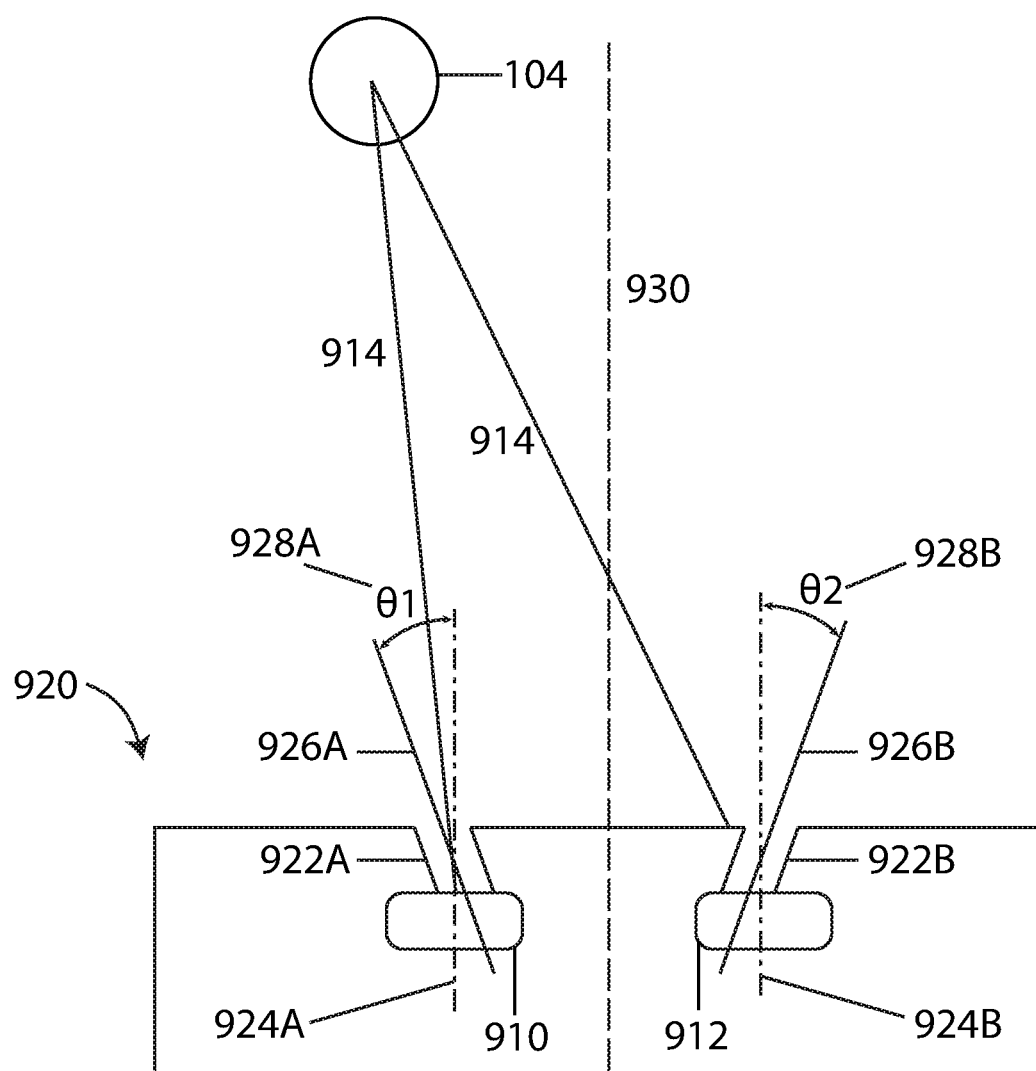

In another embodiment, as illustrated in FIGS. 10 and 11, virtual boundary device 920 may include a pair of passages 922A and 922B, which passages may be outwardly facing with respect to virtual boundary line 930. Lines 924A and 924B are parallel with virtual boundary line 930 and are provided for reference. Lines 926A and 926B are parallel with the passages 922A and 922B, respectively, and are provided for reference. As illustrated, passage 922A is angled at θ1 928A and may receive signals 914 from the robotic device 104 from a range of angles. Likewise, passage 922B is angled at θ2 928B and may receive signals 914 from a range of angles. As shown in this figure, signals 914 may only be substantially simultaneously received at both receivers 910 and 912 when the robotic device 104 is substantially along the virtual boundary or plane herein shown by a schematic line 930. The angle at which signals 914 enter passages 922A and 922B will differ based on the distance of the robotic device 104 from the receivers, but the apertures are adapted to only let signals 914 substantially simultaneously reach both receivers 910 and 912 when the robotic device is located substantially along the virtual boundary line 930.

As shown in FIG. 10, when the robotic device 104 is positioned substantially along the virtual boundary herein shown by a schematic line 930, signals 914 emitted by the robotic device can be substantially simultaneously detected by both signals receivers 910 and 912.

FIG. 11 shows the virtual boundary device 920 when the robotic device 104 is not located along the virtual boundary line 930. As is illustrated, in this position, signals 914 emitted from the robotic device 104 may reach only one of receivers 910 and 912 but not both of them.

Figure 12:
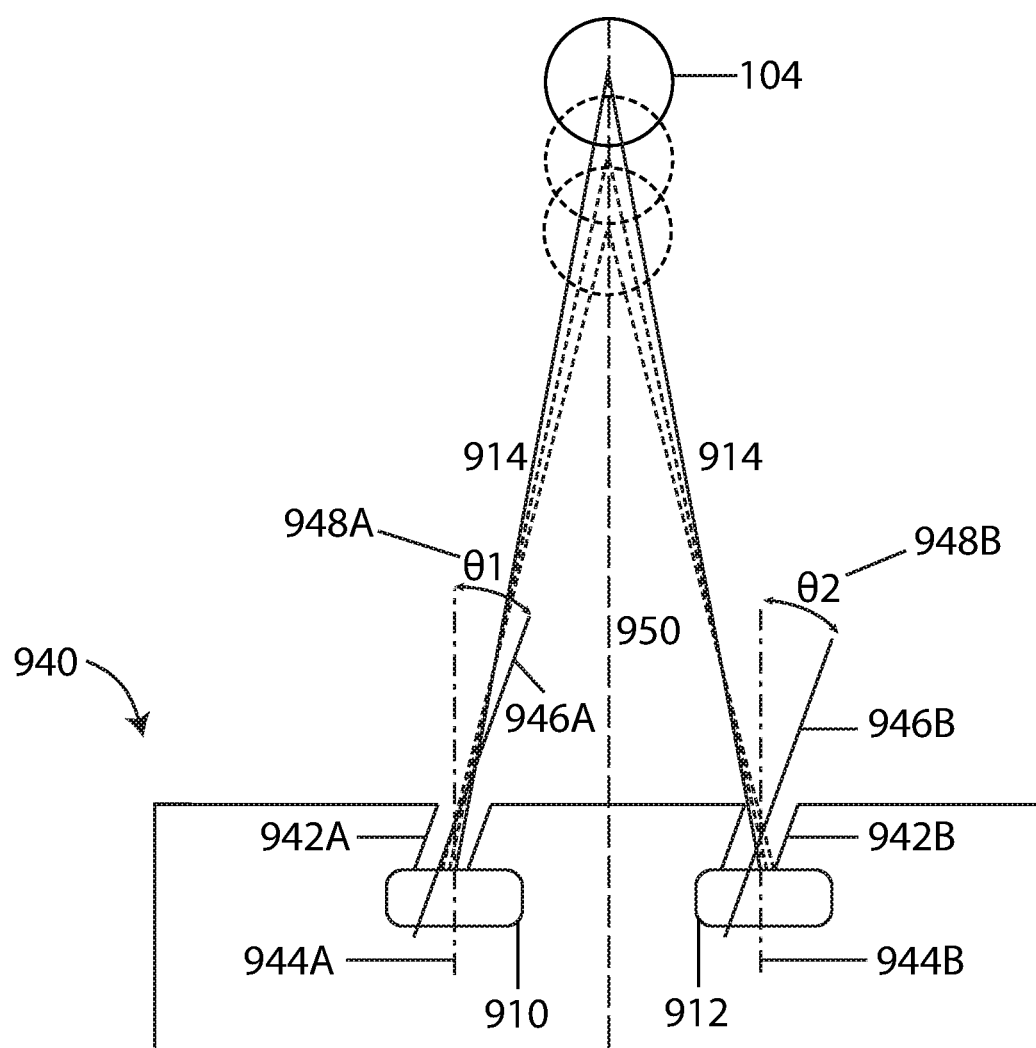
FIG. 12 and FIG. 13 illustrate a virtual boundary device with passages angled rightward embodying features of the present invention.
Figure 13:
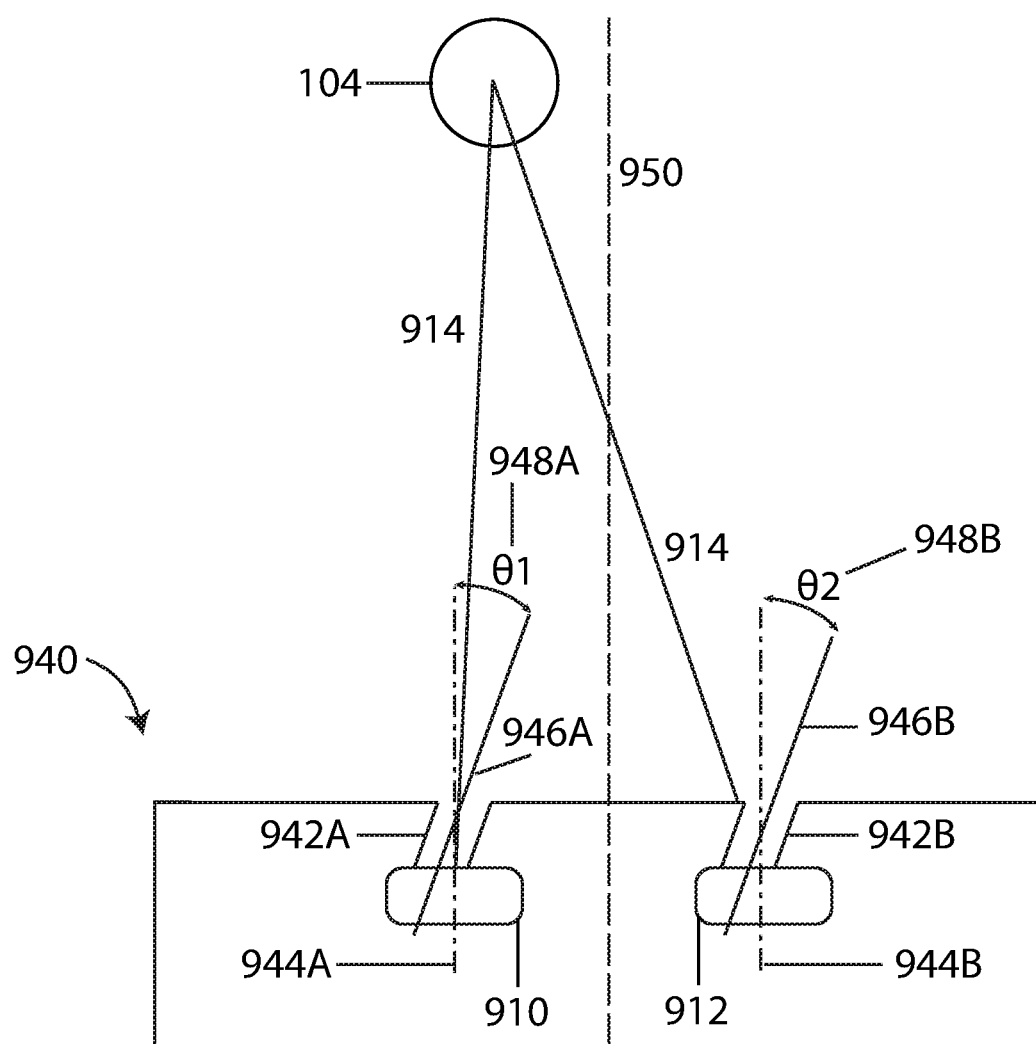

In a further embodiment, as illustrated in in FIGS. 12 and 13, virtual boundary device 940 may include a pair of passages 942A and 942B, which passages may be rightward facing with respect to virtual boundary line 950. Lines 944A and 944B are parallel with virtual boundary line 950 and are provided for reference. Lines 946A and 946B are parallel with the passages 942A and 942B, respectively, and are provided for reference. As illustrated, passage 942A is angled at θ1 948A and may receive signals 914 from the robotic device 104 from a range of angles. Likewise, passage 942B is angled at θ2 948B and may receive signals 914 from the robotic device 104 from a range of angles. As shown in this figure, signals 914 may only be received at both receivers 910 and 912 substantially simultaneously when the robotic device 104 is substantially along the virtual boundary or plane herein shown by a schematic line 950. The angle at which signals 914 enter the passages will differ based on the distance of the robotic device 104 from the receivers, but the apertures are adapted to only let signals substantially simultaneously reach both receivers 910 and 912 when the robotic device is located on the virtual boundary line 950.

As shown in FIG. 12, when the robotic device 104 is positioned substantially along the virtual boundary herein shown by a schematic line 950, signals 914 emitted by the robotic device 104 can reach both signals receivers 910 and 912 at substantially the same time.

FIG. 13 shows the virtual boundary device 920 when the robotic device 104 is not located along the virtual boundary line 950. As is illustrated, in this position, signals 914 emitted from the robotic device 104 may reach one of the receivers but not both of them.

It may be seen from the foregoing examples that passages may be configured at any angle without departing from embodiments provided herein. In addition, angles between passages may be the same or different without limitation in embodiments.

Figure 14:
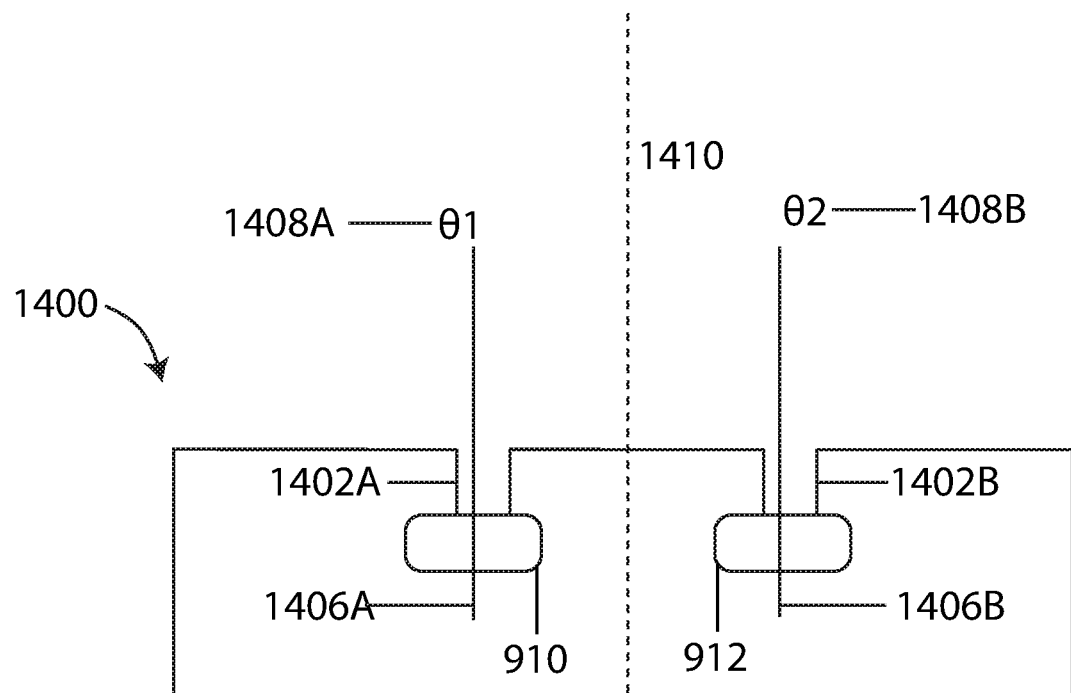
FIG. 14 illustrates a virtual boundary device with passages not angled embodying features of the present invention.

FIG. 14 illustrates a virtual boundary device embodying features of the present invention. As illustrated, virtual boundary device 1400 may include a pair of passages 1402A and 1402B, which passages may be parallel with respect to virtual boundary line 1410. As illustrated, passage 1402A has an angle θ1 1408A of approximately zero with respect to virtual boundary line 1410. That is, passage 1402A is substantially parallel with virtual boundary line 1410. Further, passage 1402A may receive signals 914 from the robotic device 104 from a range of angles (see FIG. 9A). Further illustrated, passage 1402B has an angle θ2 1408B of approximately zero with respect to virtual boundary line 1410. That is, passage 1402B is substantially parallel with virtual boundary line 1410. Further, passage 1402B may receive signals 914 from the robotic device 104 from a range of angles (see FIG. 9A). It may be seen from the foregoing examples that passages may be configured at any angle without departing from embodiments provided herein. In addition, angles between passages may be the same or different without limitation in embodiments.

Figure 15:
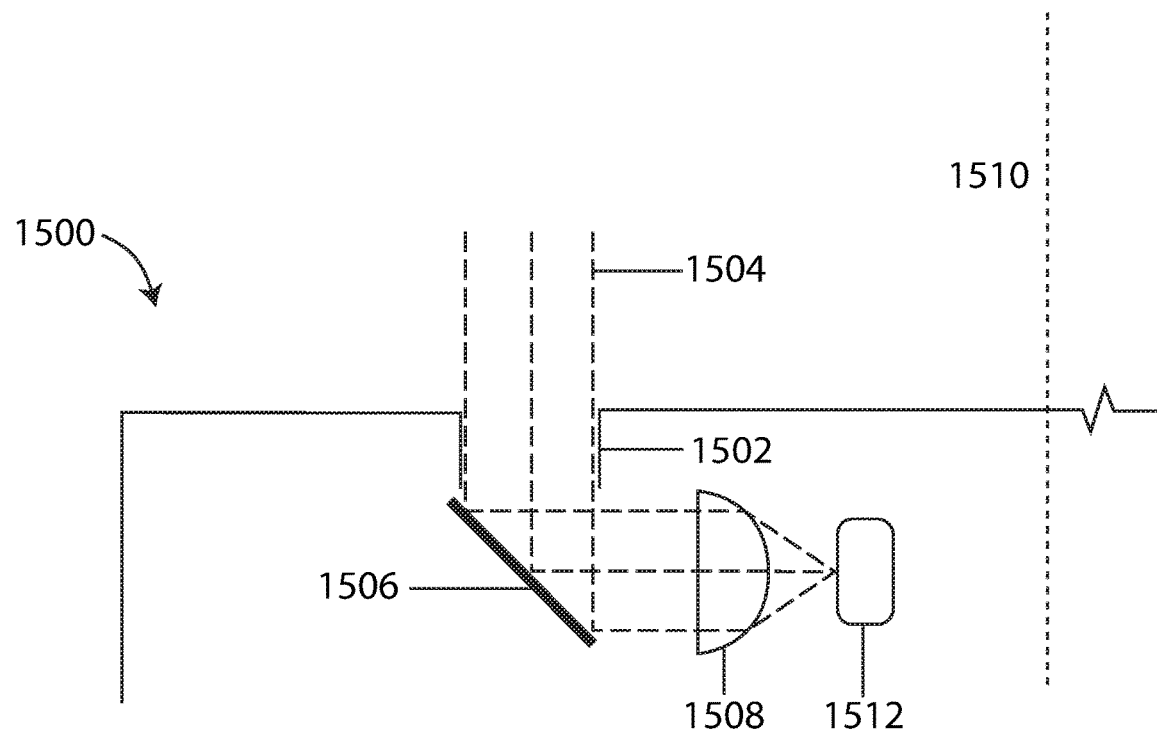
FIG. 15 illustrates a virtual boundary device with a reflective member and focusing element embodying features of the present invention.

FIG. 15 illustrates a virtual boundary device embodying features of the present invention. In particular, FIG. 15 is an illustrative representation of a passage embodiment using additional optical configurations. As illustrated, virtual boundary device 1500 may include passage 1502 that, unlike previous embodiments, terminates in reflective element 1506. As illustrated, passage 1502 is substantially parallel with virtual boundary line 1510. In embodiments, reflective element 1506 may be utilized to reflect received signals 1504 toward sensor 1512. Reflective element embodiments may be matched to reflect a particular signals or range of signals as desired. In addition, virtual boundary device 1500 may further include focusing element 1508 for focusing signals 1504 toward sensor 1512. Any type of suitable focusing element known in the art may be utilized without departing from embodiments contemplated herein. As above passages utilizing optical configurations may be at various angles with respect to a virtual boundary line without limitation and without departing from embodiments provided herein.

Figure 16:
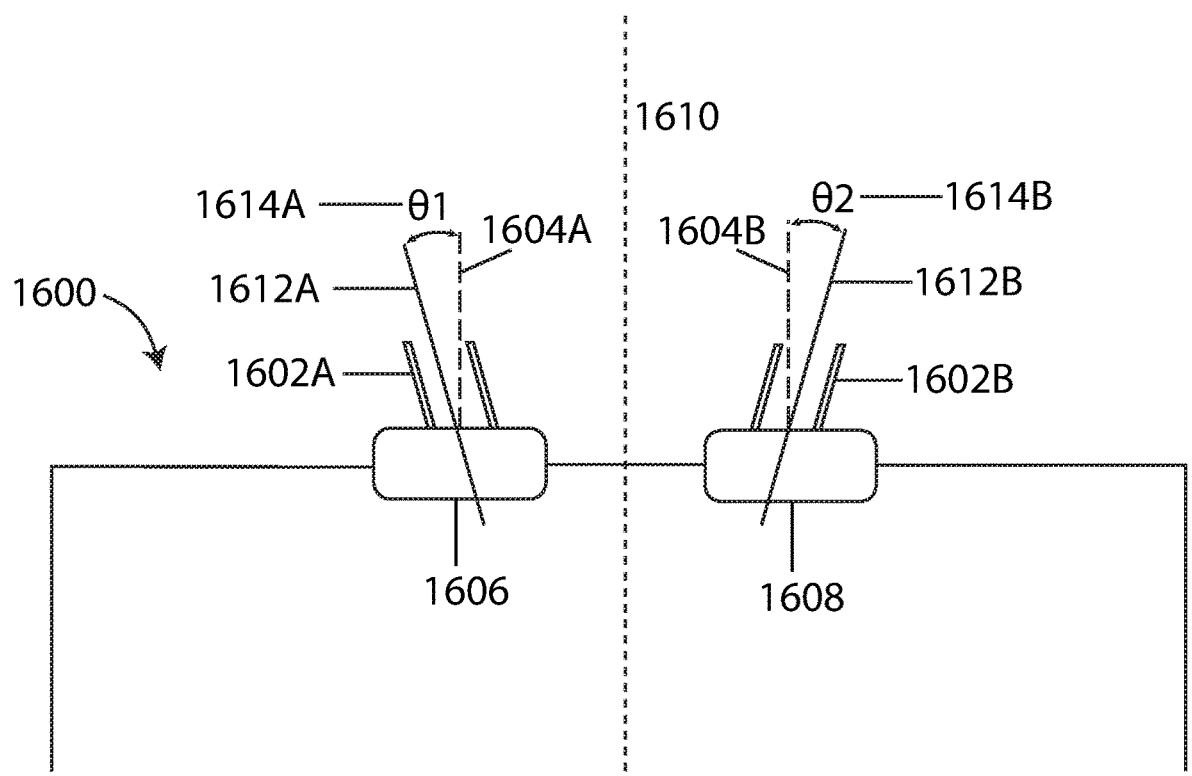
FIG. 16 illustrates a virtual boundary device with outwardly projecting members to limit the reception range of receivers embodying features of the present invention.

FIG. 16 illustrates a partial view of a virtual boundary device embodying features of the present invention. In particular, FIG. 16 is an illustrative representation of a passage embodiments 1602A and 1602B projecting out of the housing instead of having apertures inside virtual boundary device 1600. As illustrated, virtual boundary device 1600 may include passages 1602A and 1602B that, unlike previous embodiments, project out of virtual boundary device 1600, terminating respectively at receivers 1606 and 1608. Lines 1604A and 1604B are parallel with virtual boundary line 1610 and are provided for reference. Lines 1612A and 1612B are parallel with the passages 1602A and 1602B, respectively, and are provided for reference. As illustrated, passage 1602A is angled at θ1 1614A and may receive signals from a range of angles. Likewise, passage 1602B is angled at θ2 1614B and may receive signals from a range of angles. In other embodiments, the projecting members can be inwardly angled, parallel, outwardly angled or any combination of the above with respect to virtual boundary line 1610 without limitation.

It will be obvious to one skilled in the art that projecting members and hence passages may be configured at any angle without departing from embodiments provided herein. In addition, angles between projecting members may be the same or different without limitation in embodiments. In addition, in embodiments, passage angles between sensors may be the same, may be inversely related, or may be different from each other without limitation.

Figure 17:
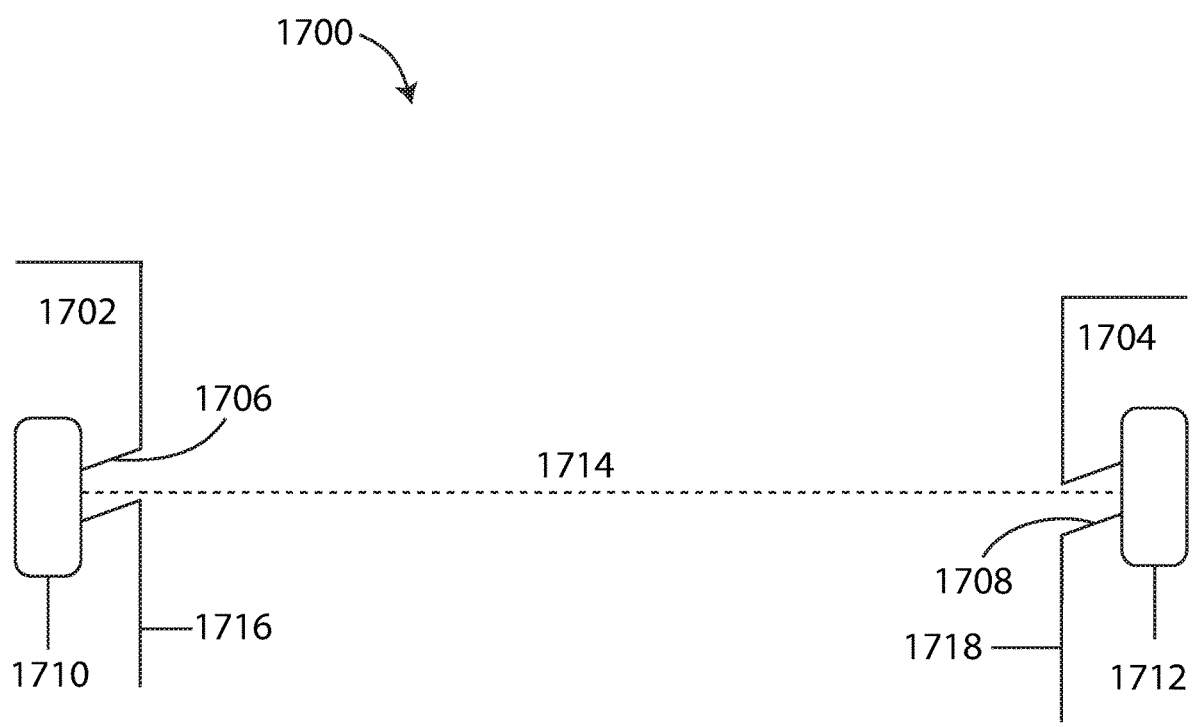
FIG. 17 illustrates a virtual boundary system comprised of two virtual boundary components embodying features of the present invention.

FIG. 17 illustrates a virtual boundary device embodying features of the present invention. As illustrated, virtual boundary device 1700 may include two housings 1702 and 1704. Within housing 1702, receiver 1710 is located at the terminal end of aperture 1706. Similarly, within housing 1704, receiver 1712 is located at the terminal end of aperture 1708. Apertures 1706 and 1708 extend respectively from surfaces 1716 and 1718 to receivers 1710 and 1712. The angle of the apertures prevents receivers 1710 and 1712 from substantially simultaneously receiving a signal unless the signal is emitted from a robotic device positioned along a line as illustrated by line 1714. Thus, when a robotic device emitting a robotic device signal is positioned along virtual boundary 1714, receivers 1710 and 1712 may substantially simultaneously receive a signal from the robotic device and thereby the robotic device may be caused to avoid the virtual boundary. In some embodiments, passage angles may be in a range of approximately −90 to 90 degrees with respect to a virtual boundary line and preferably approximately −45 to 45 degrees with respect to a virtual boundary line. In addition, in embodiments, passage angles between sensors may be the same, may be inversely related, or may be different from each other without limitation.

Figure 18A:
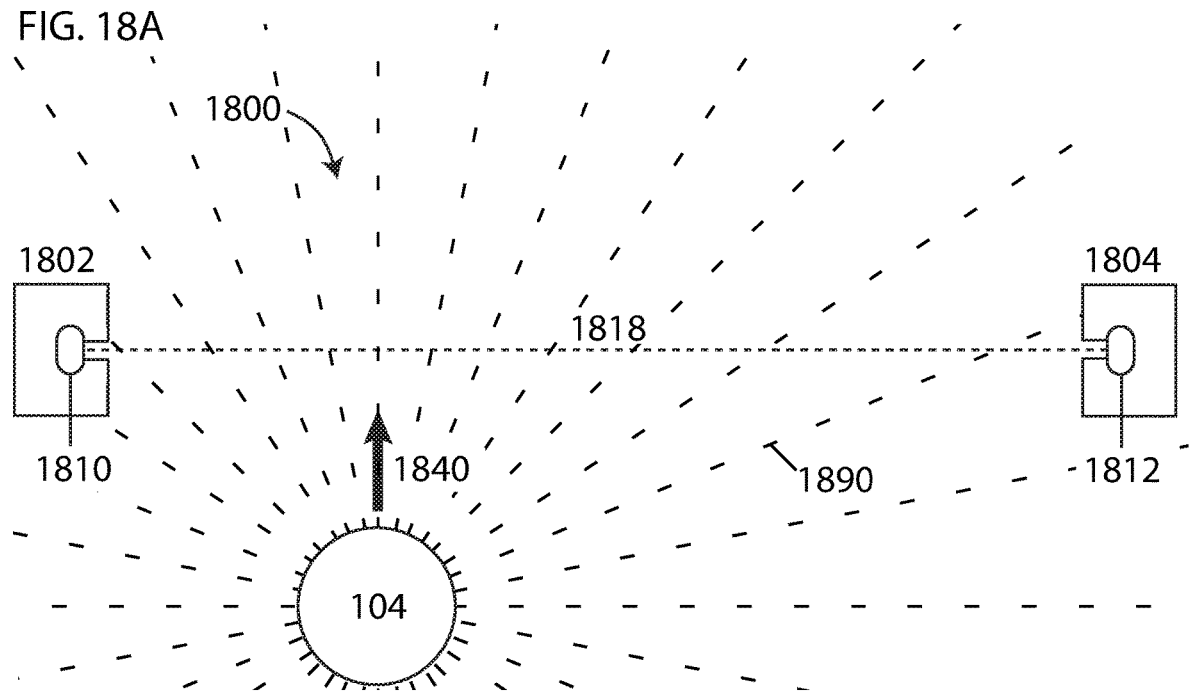
FIGS. 18A and 18B illustrate the operation of a virtual boundary system embodying features of the present invention.
Figure 18B:
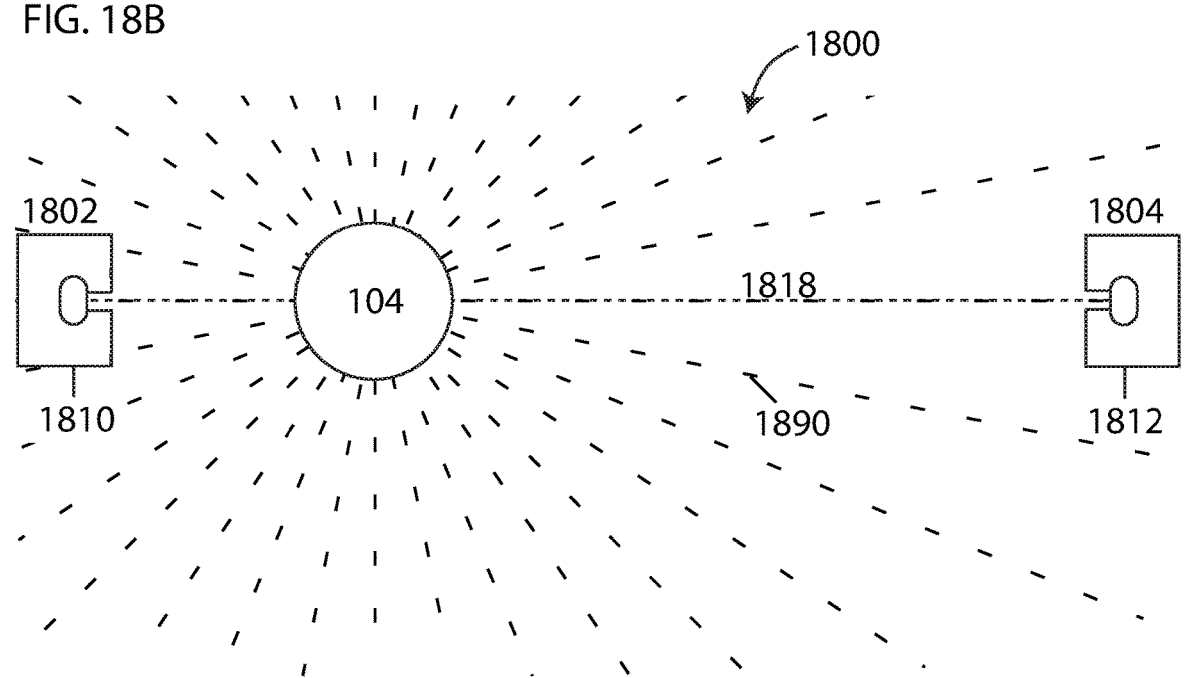

FIGS. 18A and 18B illustrate an example of the operation of the above explained system embodying features of the present invention. Virtual boundary device 1800 may be placed in a position where the user desires to restrict the movement of robotic device 104. As illustrated, virtual boundary device 1800 may have two or more housings 1802 and 1804 each having at least one receiver 1810, 1812 that establish virtual boundaries. As may be seen, receivers 1810 and 1812 establish virtual boundary 1818.

As illustrated in FIG. 18A, robotic device 104 may, in the course of executing a coverage pattern for a work area, move in direction 1840 toward virtual boundary 1818. In the position illustrated in FIG. 18A, robotic device signals 1890 do not reach both receivers 1810, 1812. After having moved in direction 1840, robotic device 104 may intersect virtual boundary 1818, as shown in FIG. 18B. In this position, robotic device signals 1890 reach both signal receivers 1810 and 1812 substantially simultaneously. Upon receiving signals 1890 by receiver 1810 from robotic device 104, housing 1802 emits a first boundary signal (transmitter not shown) that may be detected by robotic device 104. In the same manner, when signals 1890 are received by receiver 1812, housing 1804 emits a second boundary signal (transmitter not shown) that may be detected by robotic device 104. In one embodiment, when robotic device 104 receives the first and the second boundary signals substantially simultaneously, it executes preprogrammed actions to turn away or otherwise change direction to avoid further forward movement beyond the virtual boundary.

Only when the robotic device 104 is positioned approximately along virtual boundary 1818, as shown in in FIG. 18B, can receivers 1810 and 1812 substantially simultaneously receive signals 1890 emitted by robotic device 104 and are then triggered to emit the first and second boundary signals. Upon receiving the first and the second signals substantially simultaneously, robotic device 104 executes preprogrammed actions to turn away or otherwise change direction to avoid further forward movement beyond the virtual boundary 1818.

In embodiments, the robotic device may alter its movement in any number of ways such as, stopping, slowing, reversing, and changing course without limitation. In embodiments, other appropriate actions may include triggering an algorithm or marking the present location as a boundary on a map without limitation. In further embodiments methods may allow robotic devices to pass a virtual boundary after a number of times of encountering the virtual boundary. In so doing, a work area may be completed before a robotic device moves across the virtual boundary to another work area. In other embodiments, methods may provide location information as a robotic device crosses a virtual boundary. For example, when a boundary system is placed at an entrance threshold, a robotic device crossing the virtual boundary provided may signal that the robotic device has entered a particular room and is now covering that room.

In an alternative embodiment, once robotic device 104 is located at virtual boundary 1818 as shown in FIG. 18B, robotic device signal 1890 is substantially simultaneously received by receivers 1810 and 1812 of virtual boundary device 1800. A controller (not shown) detects that both receivers are receiving robotic device signal 1890 substantially simultaneously. The controller then triggers a transmitter (not shown) to emit virtual boundary signals which may be received by robotic device 104. Upon receipt of a virtual boundary signal, robotic device 104 is programmed to alter its movement to avoid further forward movement, thus avoiding crossing virtual boundary 1818. As robotic device 104 moves away from virtual boundary 1818, receivers 1810 and 1812 stop receiving robotic device signal 1890. The virtual boundary device controller detects that the robotic device signal is no longer being concurrently received by both receivers and terminates the boundary signal emissions. Thus, the robotic device is prevented from crossing the virtual boundary 1818 and thereby prevented from covering an out of bounds area. Further, after leaving the virtual boundary line, the robotic device may drive uninterrupted until it approaches the virtual boundary line again.

In some embodiments, receivers 1810 and 1812 are passive devices, which receive signals in order to establish a boundary. It should be understood that more than two receivers may be provided within a virtual boundary device to create any number of virtual boundaries and/or creating a virtual boundary with multiple layers.

Figure 19:
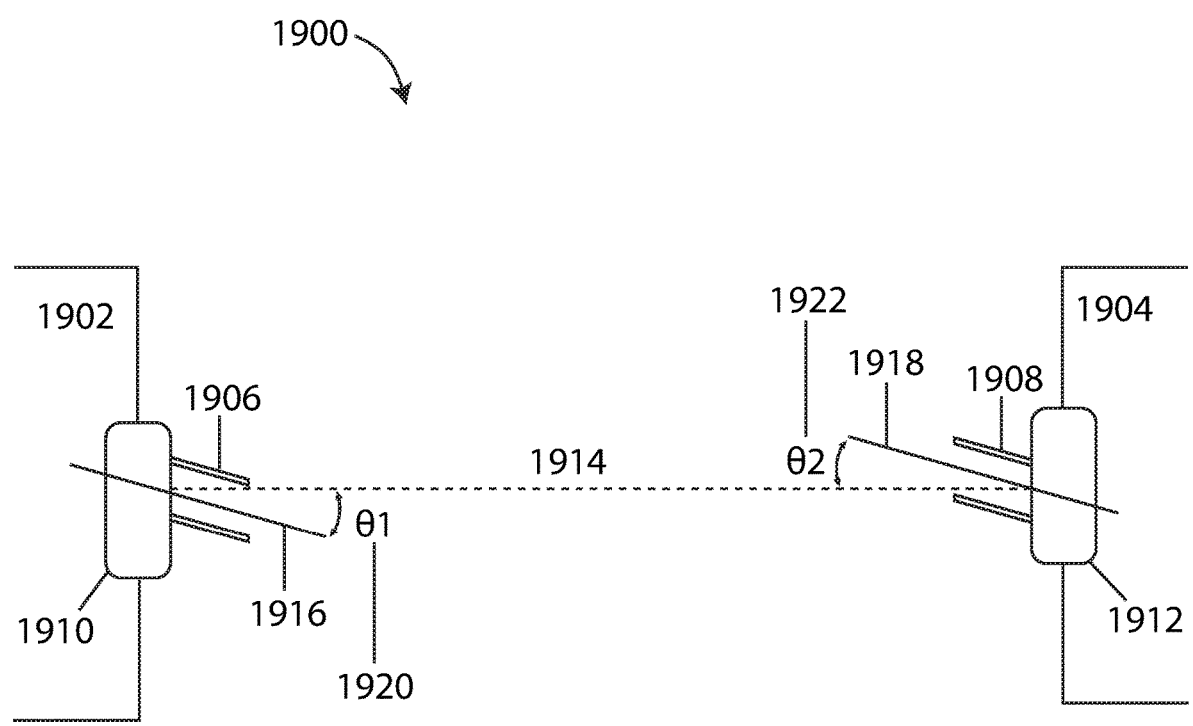
FIG. 19 illustrates a virtual boundary system comprised of two virtual boundary components with outwardly projecting members to limit the reception range of receivers embodying features of the present invention.

FIG. 19 illustrates an alternative embodiment of the virtual boundary device embodying features of the present invention. In particular, FIG. 19 is an illustrative representation of an embodiment in which passages 1906 and 1908 project out from housings 1902 and 1904 respectively (rather than limiting the signal reception range of each receiver with internal apertures as in FIG. 17). Lines 1916 and 1918 are parallel with the passages 1906 and 1908, respectively, and are provided for reference. As illustrated, passage 1906 is angled at θ1 1920 and may receive signals from a range of angles. Likewise, passage 1908 is angled at θ2 1922 and may receive signals from a range of angles. In other embodiments the projecting passages can be inwardly facing, parallel or outwardly facing or any combination of above without limitation.

In embodiments, housings or projecting members may be constructed of a type of material and a thickness, which effectively absorbs the robotic device signal. Alternatively, a circuit may monitor the signal strength of the robotic device signal at each receiver and only enables the corresponding transmitter when the robotic device signal strength exceeds a threshold amount which indicates that the robotic device signal is passing through the passage, either formed by apertures in housings or projecting members, to the respective receiver.

The number and positioning of sets of receivers may vary and is not limited. The designs shown are for illustration purposes only and are not meant to be restrictive. Various types of wireless signals, such as infrared light, laser, radio frequencies, wife signals, sonar signals, light, sound waves, global positioning signal, cellular communication device transmissions, magnetic field signal, or any other available wireless signal may be used for sending signals from the robotic device to the transceiver and for sending signals from the transceiver's emitter to the robotic device.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for confining robotic devices to an area, the method comprising:
   positioning a virtual boundary device comprising a receiver pair, each receiver of the receiver pair positioned within an aperture, such that each receiver of the receiver pair is capable of receiving a signal from a robotic device substantially simultaneously when the robotic device is positioned along a first virtual boundary, wherein the angular position of at least one aperture physically prevents the signal transmitted from the robotic device to substantially simultaneously reach both receivers of the receiver pair when the robotic device is not positioned along the first virtual boundary;
   operating the robotic device to move automatically within an area co-located with the first virtual boundary;
   transmitting the robotic device signal by the robotic device;
   receiving the robotic device signal by each receiver of the receiver pair substantially simultaneously thereby indicating that the robotic device is positioned along the first virtual boundary;
   transmitting a signal by a transmitter of the virtual boundary device indicating that the robotic device is at the first virtual boundary;
   the robotic device receiving the signal transmitted by the virtual boundary device; and,
   the robotic device enacting one of a number of predetermined responses.

2. The method of claim 1, wherein the predetermined response comprises either one of:
   altering the robotic device movement to avoid crossing the virtual boundary, or
   the robotic device continuing navigation beyond the virtual boundary.

3. The method of claim 1, further comprising:
   the virtual boundary device transmitting a first boundary signal to the robotic device upon the robotic device signal being received by a first receiver of the receiver pair of the virtual boundary device;
   the virtual boundary device transmitting a second boundary signal to the robotic device upon the robotic device signal being received by a second receiver of the receiver pair of the virtual boundary device; and,
   altering the robotic device movement to avoid crossing the virtual boundary in response to receiving the first and the second boundary signals, substantially simultaneously, by the robotic device.

4. The method of claim 1, wherein the robotic device signal is only transmitted during a designated time.

5. The method of claim 1, wherein the receiver pair is configured to receive the robotic device signal only during a designated time.

6. The method of claim 3, wherein the first and the second boundary signals are transmitted only during a designated time.

7. The method of claim 1, further comprising:
   the virtual boundary device comprising at least one additional receiver pair to receive the robotic device signal substantially simultaneously from the robotic device only when the robotic device is positioned along at least one additional boundary;
   operating the robotic device to move automatically within an area co-located with the at least one additional virtual boundary;
   transmitting the robotic device signal by the robotic device; and
   receiving the robotic device signal by the at least one additional receiver pair thereby indicating that the robotic device is positioned along the at least one additional virtual boundary.

8. The method of claim 7, wherein the at least one additional receiver pair is positioned in at least one additional housing.

9. The method of claim 7, wherein two receiver pairs are pivotally coupled with one another.

10. The method of claim 1, wherein the apertures extend inwardly within the virtual boundary device and each receiver of the receiver pair is positioned at a distal end of an aperture extending inwardly.

11. The method of claim 1, wherein the apertures are angled in a range of approximately −45 to 45 degrees.

12. The method of claim 1, wherein the robotic device signal is selected from the group consisting of: infrared, laser, radio frequency, Wi-Fi, and sonar.

13. A method for confining robotic devices to an area, the method comprising:
   positioning a virtual boundary device comprising a receiver pair, each receiver of the receiver pair positioned within a projecting member, such that each receiver of the receiver pair is capable of receiving a signal from a robotic device substantially simultaneously when the robotic device is positioned along a first virtual boundary, wherein the angular position of at least one projecting member physically prevents the signal transmitted from the robotic device to substantially simultaneously reach both receivers of the receiver pair when the robotic device is not positioned along the first virtual boundary;
   operating the robotic device to move automatically within an area co-located with the first virtual boundary;
   transmitting the robotic device signal by the robotic device;
   receiving the robotic device signal by each receiver of the receiver pair substantially simultaneously thereby indicating that the robotic device is positioned along the first virtual boundary;
   transmitting a signal by a transmitter of the virtual boundary device indicating that the robotic device is at the first virtual boundary;
   the robotic device receiving the signal transmitted by the virtual boundary device; and,
   the robotic device enacting one of a number of predetermined responses.

14. The method of claim 13, wherein the predetermined response comprises either one of:
   altering the robotic device movement to avoid crossing the virtual boundary, or
   the robotic device continuing navigation beyond the virtual boundary.

15. The method of claim 13, further comprising:
   the virtual boundary device transmitting a first boundary signal to the robotic device upon the robotic device signal being received by a first receiver of the receiver pair of the virtual boundary device;
   the virtual boundary device transmitting a second boundary signal to the robotic device upon the robotic device signal being received by a second receiver of the receiver pair of the virtual boundary device; and, altering the robotic device movement to avoid crossing the virtual boundary in response to receiving the first and the second boundary signals, substantially simultaneously, by the robotic device.

16. The method of claim 13, wherein the receiver pair is configured to receive the robotic device signal only during a designated time.

17. The method of claim 13, further comprising:

the virtual boundary device comprising at least one additional receiver pair, each receiver of the receiver pair positioned within a projecting member, to receive the robotic device signal substantially simultaneously from the robotic device only when the robotic device is positioned along at least one additional boundary;

operating the robotic device to move automatically within an area co-located with the at least one additional virtual boundary;

transmitting the robotic device signal by the robotic device; and receiving the robotic device signal by the at least one additional receiver pair thereby indicating that the robotic device is positioned along the at least one additional virtual boundary.

18. The method of claim 17, wherein two receiver pairs are pivotally coupled with one another.

19. The method of claim 13, wherein the projecting members extend outwardly beyond the virtual boundary device, each receiver of the receiver pair is positioned at a proximal end of a projecting member extending outwardly, and the projecting members are angled in a range of −45 to 45 degrees.

* * * * *